July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 1

INVENTOR:
ANTONIE SNIJDERS.
BY Hugh A. Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 2

INVENTOR:
ANTONIE SNIJDERS.
BY Hugh A. Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 3

INVENTOR:
ANTONIE SNIJDERS
BY
Hugh A Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 4

G= MULTIVIBRATOR GENERATOR

SSS= START-STOP CIRCUIT

INVENTOR:
ANTONIE SNIJDERS.
BY Hugh A. Kirk
ATTY

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 5

INVENTOR:
ANTONIE SNIJDERS.
BY Hugh A Kirk
ATTY.

INVENTOR:
ANTONIE SNIJDERS
BY Hugh A. Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 7

INVENTOR:
ANTONIE SNIJDERS
BY Hugh A. Kirk
ATTY.

July 8, 1958 A. SNIJDERS 2,842,616
ELECTRONIC TRANSMITTER, RECEIVER AND REGENERATIVE REPEATER FOR TELEGRAPH SIGNALS IN A START-STOP CODE
Filed Nov. 24, 1952 14 Sheets-Sheet 8
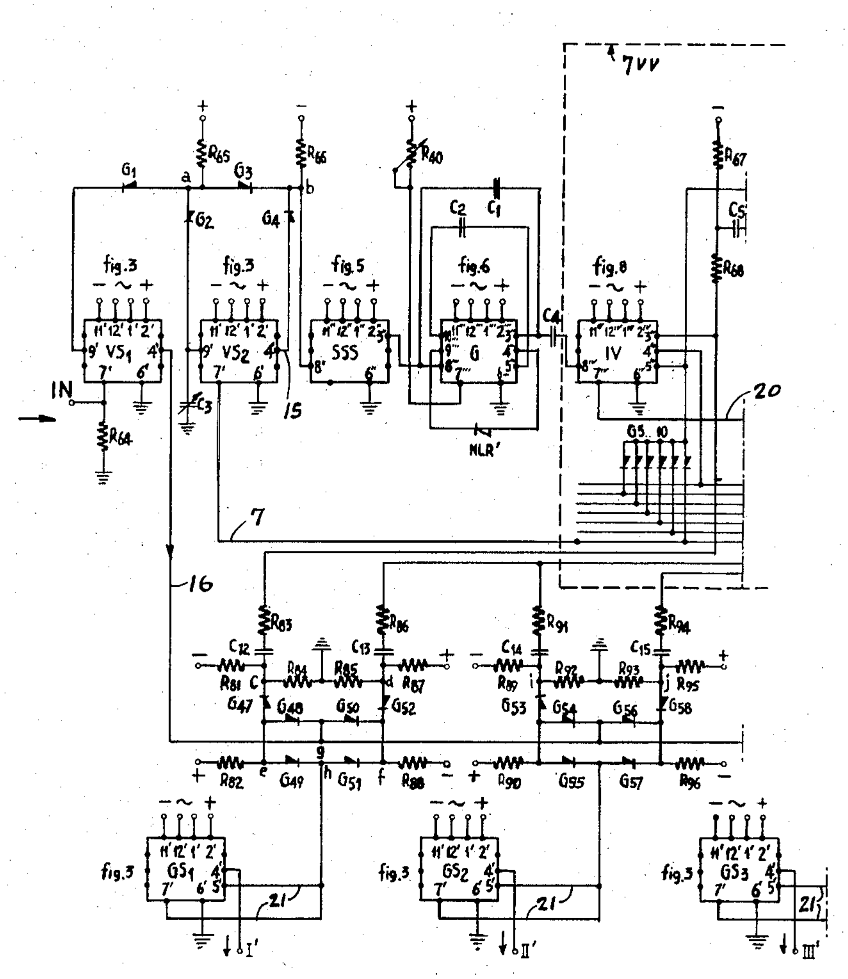
Fig.11
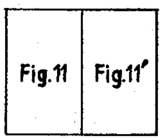
RECEIVER
INVENTOR:
ANTONIE SNIJDERS.
BY Hugh A. Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 9

INVENTOR:
ANTONIE SNIJDERS
BY Hugh A. Kirk
ATTY.

| Fig.12 | Fig.12' |
|---|---|

TRANSMITTER

INVENTOR:
ANTONIE SNIJDERS
BY Hugh A Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 11

INVENTOR:
ANTONIE SNIJDERS.
BY Hugh A. Kirk
ATTY.

REGENERATIVE REPEATER

INVENTOR:
ANTONIE SNIJDERS.
BY Hugh A Kirk
ATTY.

July 8, 1958 A. SNIJDERS 2,842,616

ELECTRONIC TRANSMITTER, RECEIVER AND REGENERATIVE REPEATER FOR TELEGRAPH SIGNALS IN A START-STOP CODE

Filed Nov. 24, 1952 14 Sheets-Sheet 13

INVENTOR:
ANTONIE SNIJDERS.
BY Hugh A. Kirk
ATTY.

July 8, 1958 A. SNIJDERS 2,842,616
ELECTRONIC TRANSMITTER, RECEIVER AND REGENERATIVE REPEATER FOR TELEGRAPH SIGNALS IN A START-STOP CODE
Filed Nov. 24, 1952 14 Sheets-Sheet 14
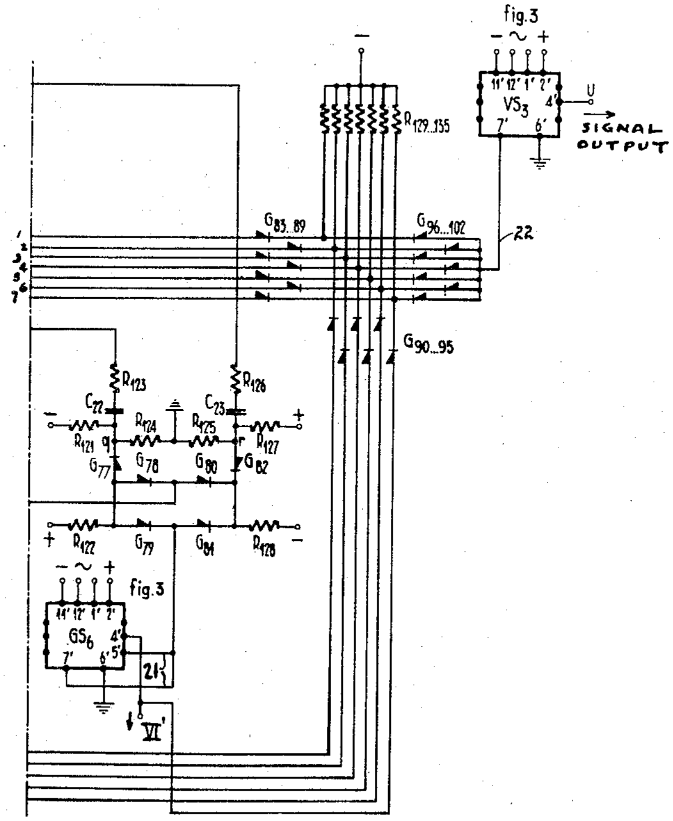
Fig. 13"
INVENTOR:
ANTONIE SNIJDERS.
BY Hugh A. Kirk
ATTY.

United States Patent Office 2,842,616

Patented July 8, 1958

2,842,616

ELECTRONIC TRANSMITTER, RECEIVER, AND REGENERATIVE REPEATER FOR TELEGRAPH SIGNALS IN A START-STOP CODE

Antonie Snijders, The Hague, Netherlands, assignor to Staatsbedrijf der Posterijen, Telegrafie en Telefonie, The Hague, Netherlands Application November 24, 1952, Serial No. 322,180

28 Claims. (Cl. 178—53.1)

This invention relates to a completely or fully electronic communication circuit. More particularly it deals with such an electronic circuit adapted for transmission, reception and/or regenerative repetition of stop-start multi-element telegraph code signals, such as for example a five-unit or element time-spaced binary code in which each code signal may also include at least one synchronizing element, such as a stop and/or start element.

The first telegraph communication circuits for multi-element code signals involved mechanical means such as devices for the opening and closing of contacts, the energization of relays, and/or the moving of armatures for scanning the elements of each signal. Later this scanning was effected by means of a vibrating relay (see Oberman U. S. Patent 2,546,369) and then this vibrating relay was replaced by a multivibrator circuit with the signal elements being stored on condensers (see Van Duuren co-pending U. S. patent application Serial No. 251,270, filed October 15, 1951, for "Telegraph Over Radio" (TOR Junior) system). Electromechanical regenerative repeaters were disclosed in Oberman et al. U. S. Patent No. 2,599,345, in which the scanning of the intelligence elements of each signal is effected by means of a multivibrator and a start-stop device comprising two electron tubes and a relay.

A known fully electronic distributor is disclosed in the British Patent No. 572,884 which employs a plurality of resistors for producing the desired distributing results.

It is an object of the present invention to produce a simple, efficient, effective and economic fully electronic communication circuit for scanning mutli-element signals.

Another object is to produce such a fully electronic circuit which contains less apparatus and a fewer number of electron tubes than the circuits previously known, thereby materially reducing the maintenance costs for the circuit.

Another object is to produce a fully electronic basic communication circuit which may be readily adapted for use in several different apparatus, including: (1) a transmitter to form the multi-element code signals from separate elements such as from a telegraphic code perforated tape; (2) a receiver to separate said elements from a code signal such as for the control of a telegraph code type printer; (3) a regenerative repeater to separate and reform the said elements such as for long line code telegraph circuits.

Another object is to produce such a circuit which produces signals having very small distortion, and which is sufficiently sensitive to detect incoming signals having greater distortions than those normally capable of detection in many previously known circuits, thereby permitting a fewer number of repeater circuits to be used in a given length of transmission line.

Another object is to produce such a circuit which may be adjusted as to the time-length of one or more of its synchronizing elements, so as to automatically compensate for transmitters which transmit signals at too fast or too slow a rate.

Another object is to produce such a circuit which ignores false starts or pulses by measuring the length of received pulses to insure that only start pulses of a predetermined duration will instigate the circuit.

Another object is to produce such a circuit which may be adapted to automatic telegraph networks, wherein five, six, seven or even more elements per signal are transmitted, received and/or automatically regenerated and repeated.

Another object of this invention is to produce such a telegraph communication circuit in which electronic relay cells are employed, such as those described in the Snijders co-pending U. S. Patent application Serial No. 300,817, filed July 25, 1952. These electron relays involve a plurality of rectifiers connected to a junction and conducting in the same direction with respect to said junction, which junction may also be connected through a low impedance to a potential source, whereby the flow of current through a given one or more rectifiers from said junction may be controlled by the application of different potentials to the other rectifiers connected to said junction.

Generally speaking, the system of this invention can readily be adapted to a transmitter, receiver, or regenerative repeater, each of which is able to detect a plurality of consecutive equal time-length intelligence elements of a multi-element code signal, determine their polarity, store or record said polarity in memory devices, and retransmit or pass the intelligence of these polarities on without distortion, substantially immediately upon their reception by the system.

The electronic circuits employed in carrying out these functions comprise amplifiers, a start-stop circuit, a multivibrator or generator circuit, a distributor circuit, storing or memory circuits, a plurality of electronic relay cell means according to said above mentioned Snijders application Serial No. 300,817, and electrical conductors, resistances and capacitances for interconnecting said circuits. The scanning portion of the system of this invention may include an amplifier, the start-stop circuit, the multivibrator and the distributor circuits and their connections. Each of these circuits, however, may be composed of one or more of a few standard types of unit circuits, each unit circuit comprising a pair of electron discharge tubes, or a double tube, some of which may be connected together to act as flip-flop, trigger or bi-stable circuit. The standard bi-stable or flip-flop type of circuit may be used as incoming, storing and outgoing circuits in the present system.

The start and stop circuit controls the start and stop of the scanning portion of the system in response to each multi-element code signal. This means that the multivibrator and distributor circuits may be started and stopped once for each complete code signal. In this way, synchronism with incoming signals is not required in that each signal is separately received and the circuit is shut off after its reception until the start element of the next following signal is received to start the circuit again. It is to be realized, however, that this stopping and starting occurs several times each second, in that one complete code signal is usually only about 140 milliseconds, including its start and stop elements. In the case of a transmitter system, the circuit may be automatically started a given time after each complete code signal has been transmitted.

The distributor circuit may comprise a series or chain of successively operated circuits each having a pair of tubes, all of which tubes are interconnected by electronic relay cell means connected to separate conductors or rails corresponding in number to the elements in each signal, to insure only the operation or conductivity of one tube at a time in the whole distributor circuit. The start signal, which instigates the multivibrator, causes the multivibrator to operate the distributor circuit in synchronism and in sequence with the elements of one signal, so that as the elements of this code are received and/or transmitted, their polarity is connected through other and at least a pair of electronic relay cell means for each element in the signal, to their corresponding bistable memory or storing circuits. After the multivibrator has successively set up and stored each of the signals, the distributor then operates to shut-off or stop the multivibrator until the next start element in received to repeat the operation again. The storing circuits are accordingly reset by the next following element of each signal as it is received, and if the corresponding element of the next signal is not different from that just received and stored, there will be no change in the condition of that storing circuit.

The code signals which are employed in the system of this invention are preferably composed of a plurality of equally time spaced elements, and each signal preferably includes at least a start element always of a given polarity and may also include a stop element always of the opposite polarity, one at each end of the multi-consecutive equally-time-spaced intelligence elements which vary in polarity according to the intelligence to be transmitted. The duration of the start element is preferably the same as that of each of the intelligence elements, and also preferably equal to that of the stop element. The start element, however, must have at least a minimum duration of half the corresponding time allotted to each intelligence element, in that the multivibrator controlling the scanning of this invention is operated to detect the polarity or condition of the elements in the code at a point substantially half way between the start and the termination of the duration of each element, or midway between leading and trailing edges of each intelligence element pulse. Thus, false start elements or pulses having durations of less than half the required time for each element of the signal, will not be responded to by the system of this invention.

The duration of the stop element at the end of each signal may be varied within limits to automatically compensate for signals which are received at too fast or too slow a rate in comparison with the normal operation of the present system. This may be controlled through a pair of electronic relay cell means and a variable capacitance connected at the end of the system which controls the start-stop circuit.

The above mentioned and other features and objects of this invention and the manner of attaining them are given more specific disclosure in the following description of embodiments of the invention taken in conjunction with the accompanying drawings, wherein.

Figure 11:
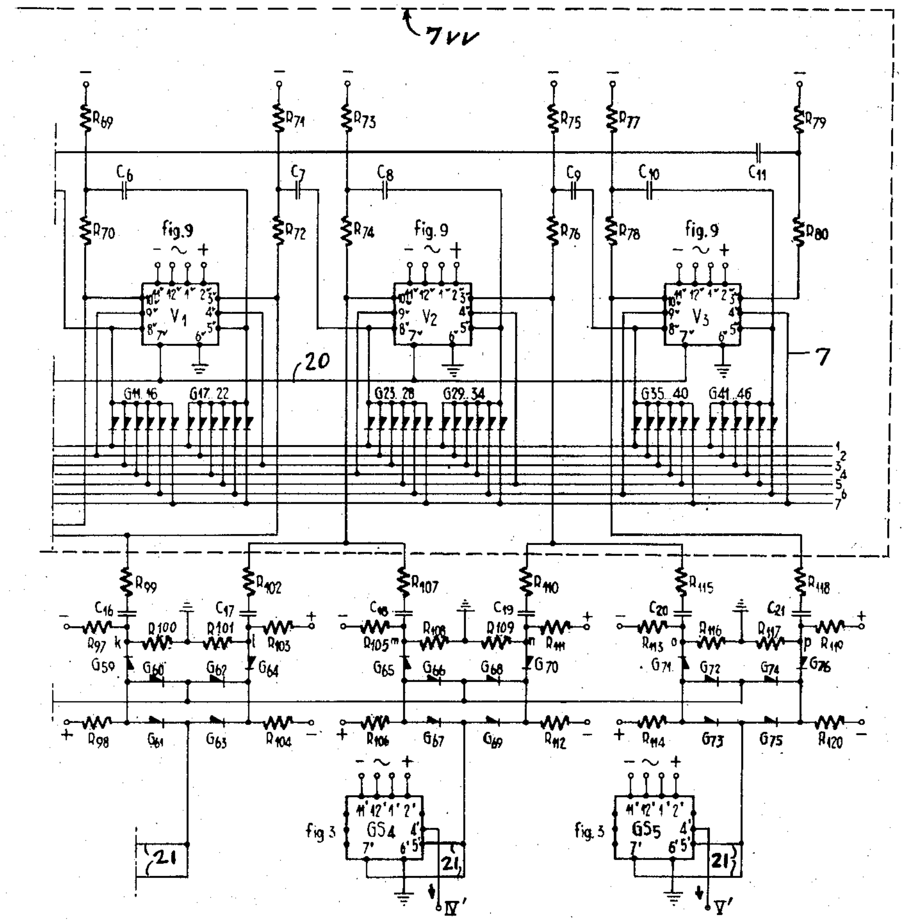
Figure 12:
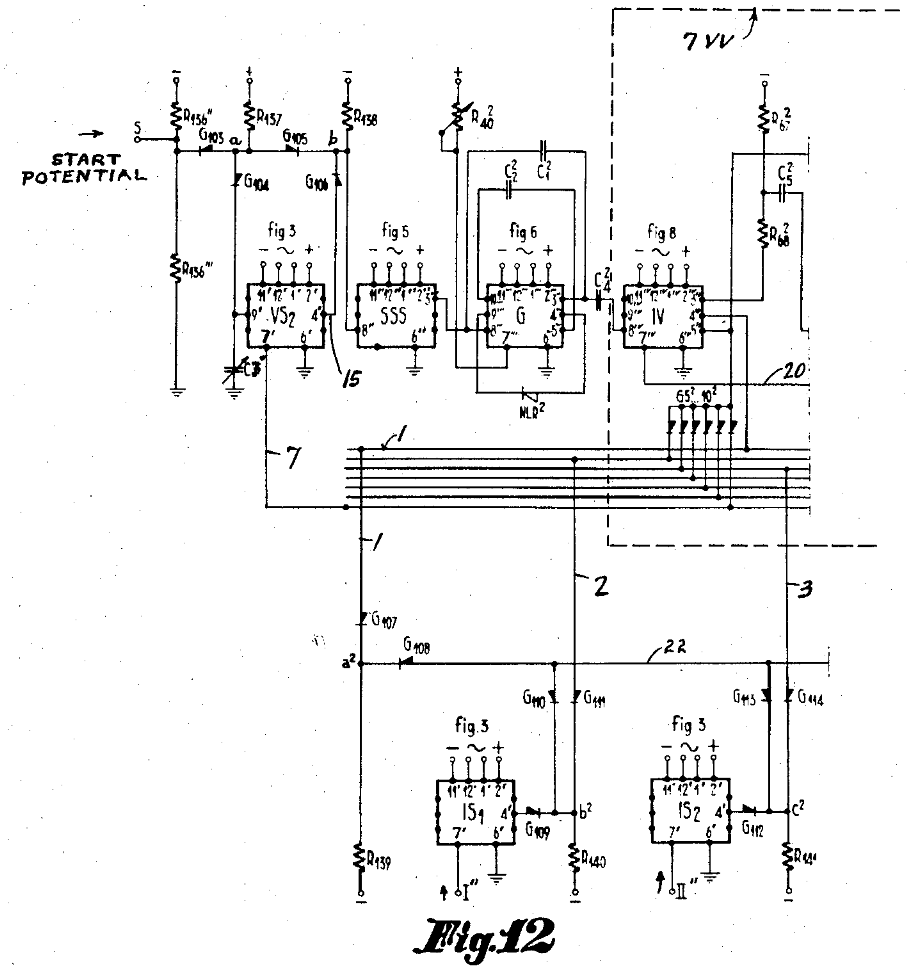
Figure 12:
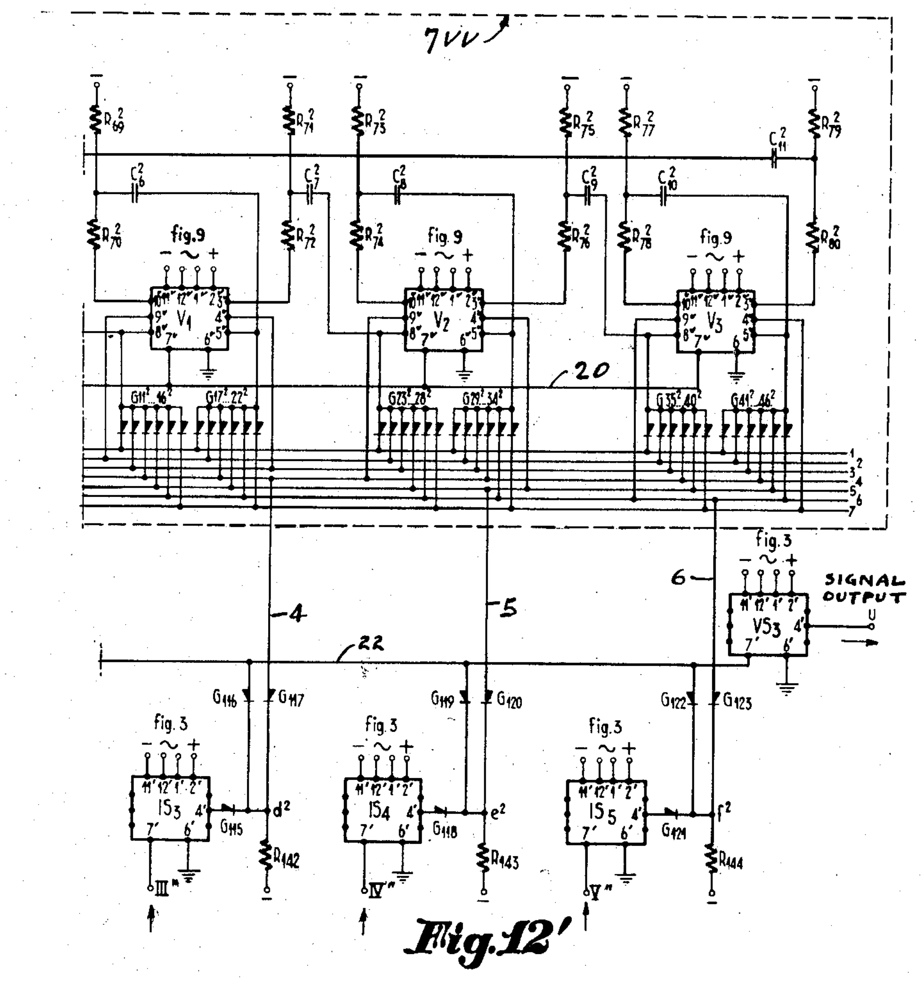
Figure 13:
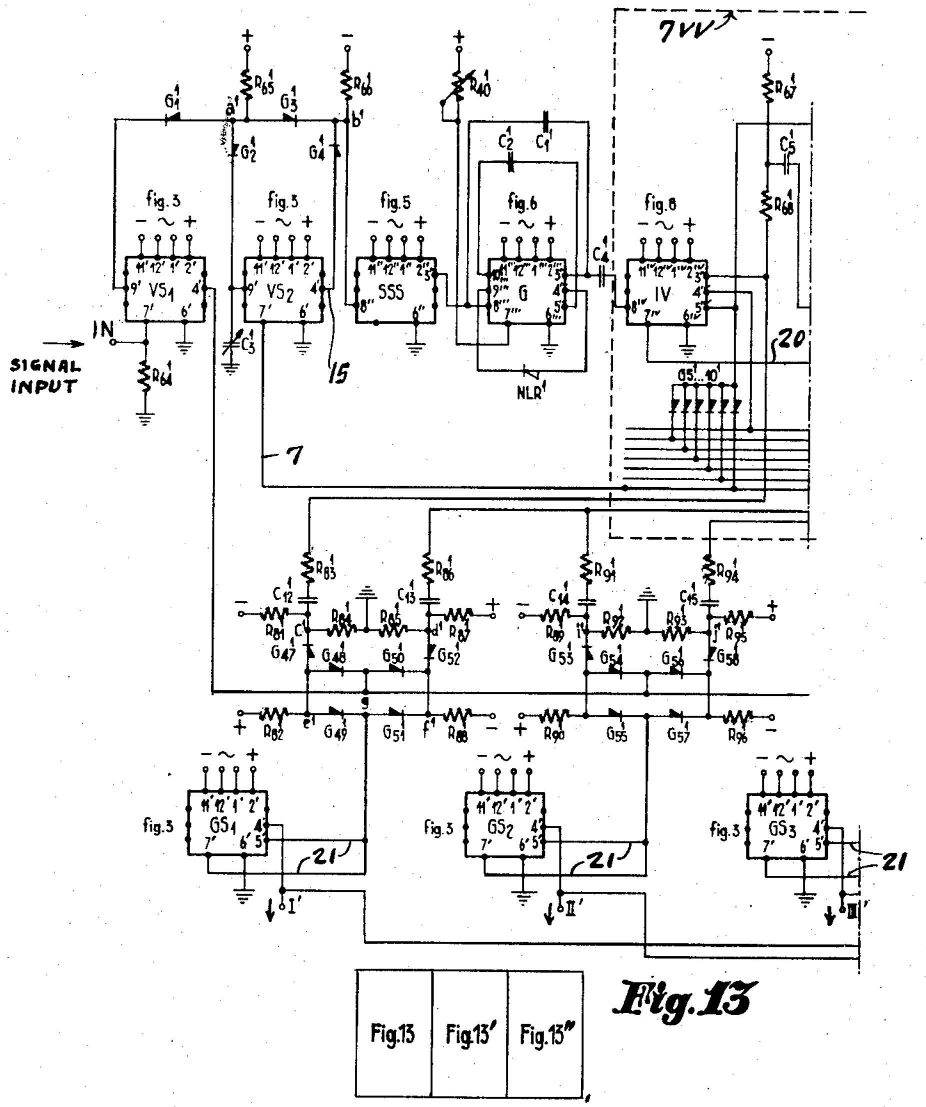
Figure 13:
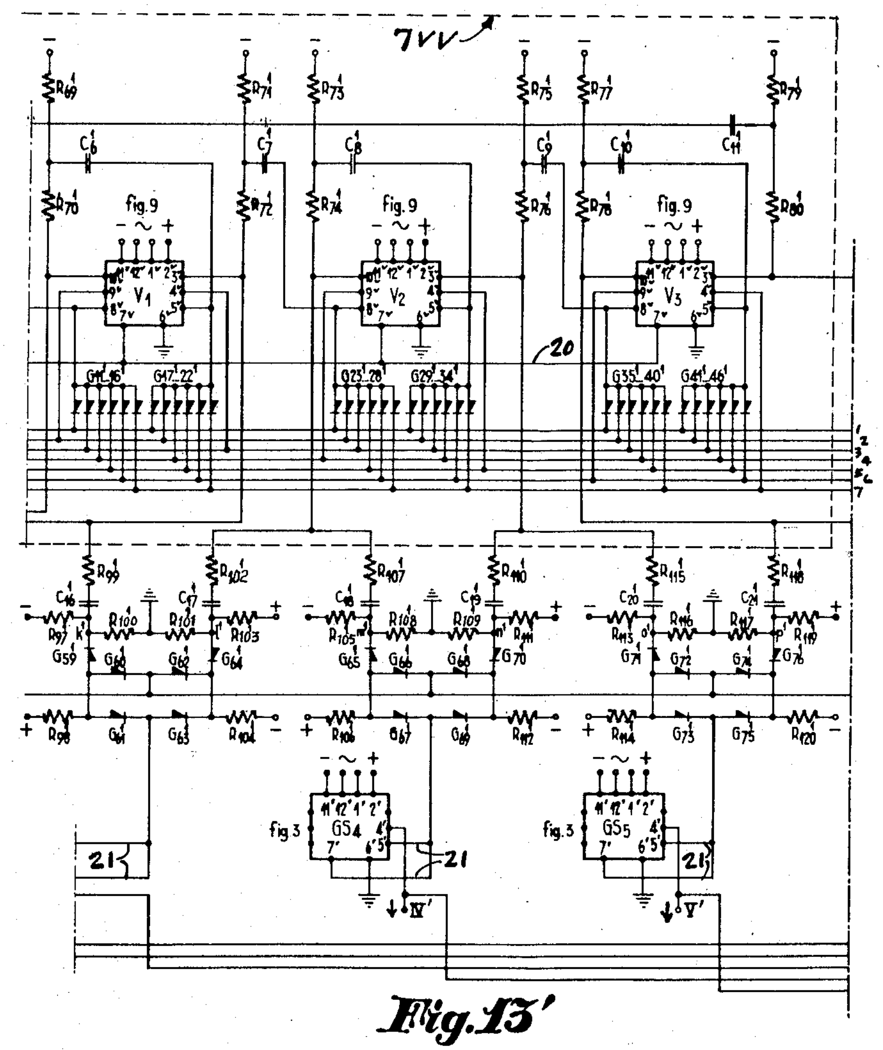

Figs. 11 and 11′ show a schematic block and circuit diagram of a receiver embodying the present invention and adapted for receiving five-unit start-stop telegraph code signals, with the circuits already presented in Figs. 3, 5, 6, 8 and 9 being shown in blocks with their corresponding reference characters and terminals indicated on them;

Figs. 12 and 12′ show a schematic block and circuit diagram of a transmitter embodying the present invention with the circuits already presented in Figs. 3, 5, 6, 8 and 9 being shown in blocks and adapted to be used in a system with the circuit of Fig. 11; and Figs. 13, 13′ and 13″ show a schematic block and circuit diagram for a regenerative repeater embodying the present invention, with the circuits already presented in Figs. 3, 5, 6, 8, 9 being shown in blocks, and adapted to be used as a repeater in a long line circuit between the circuits of Figs. 11 and 12.

In order to illustrate this invention the following description by way of example is directed to systems for communicating telegraph code signals of marks and spaces, or + and − pulses, comprising seven equal time-spaced elements. The specific systems and circuits for the reception, transmission and regenerative repetition of this type of multi-element signal now will be described in accordance with the following outline:

I. Multi-element signal (Fig. 1)
II. General circuits
  (1) Arrangement (Fig. 2)
  (2) Standard trigger circuit (Figs. 3 and 4)
  (3) Start-stop and generator circuits (Figs. 5, 6 and 7)
  (4) Distributor circuit (Figs. 8 and 9)
III. A receiver
  (1) Rest condition
  (2) Start-stop and distributor
  (3) Scanning and storing
IV. A transmitter (Figs. 12)
V. A regenerator repeater (Figs. 13)

I. MULTI-ELEMENT SIGNAL

Figure 1:
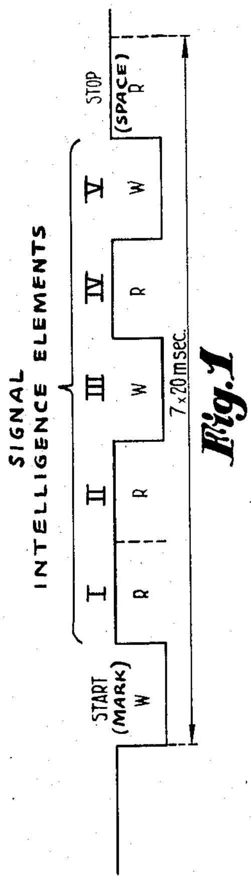
Fig. 1 is a wave diagram of a signal having five intelligence elements preceded by a start element of negative potential and followed by a stop element of positive potential.

Referring to Fig. 1 a wave form of one complete start-stop code signal is graphically disclosed to be composed of seven elements, each of 20 milliseconds' duration, in which the first, start or mark element is indicated as a negative pulse W and the seventh stop or space element is indicated as a positive pulse R, while the five intelligence elements I, II, III, IV and V may be either spaces R or marks W. The start and stop elements are preferably of opposite polarity from each other, however, either may be of mark potential or polarity. The duration in time-length of the seventh, last or stop element may be varied to compensate for signals which are received or transmitted at too fast or too slow a rate by permitting the leading edge of the start element of the next succeeding signal to form the trailing edge of said stop element.

However, there is a preferred minimum limit for the duration of one complete signal, namely about 130 milliseconds, which duration may be controlled or adjusted by a condenser or capacitor C3 (see Fig. 11) and/or by the frequency of the multivibrator generator G. If this limit were reduced more it would reduce the regenerative capacity of the system, particularly when used as a regenerative repeater. This limit is also determined by the fact that the start element pulse must have a duration of at least 10 milliseconds before the system of this invention will respond to a signal. This feature also enables each of the intelligence signal elements to be scanned about 10 milliseconds after their leading edges, or about in their centers (see Fig. 10), which permits considerable more distortion of their pulse edges than could normally be tolerated in some previously known systems. Thus, the circuits of this invention are timed so that the first intelligence element is scanned 30 milliseconds after the leading edge of the start element of its corresponding signal.

II. GENERAL CIRCUITS

(1) *Arrangement*

Figure 2:
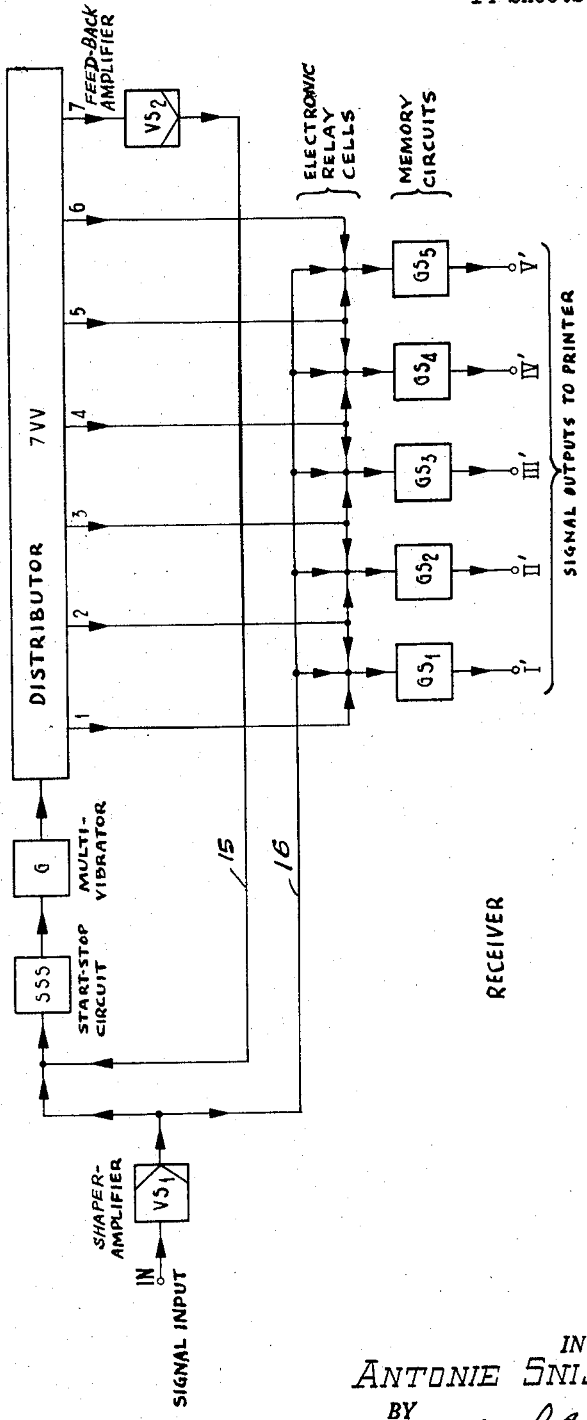
Fig. 2 is a schematic block diagram of the fully electronic system according to the present invention adapted for convenience to a receiver system circuit.
Figure 10:
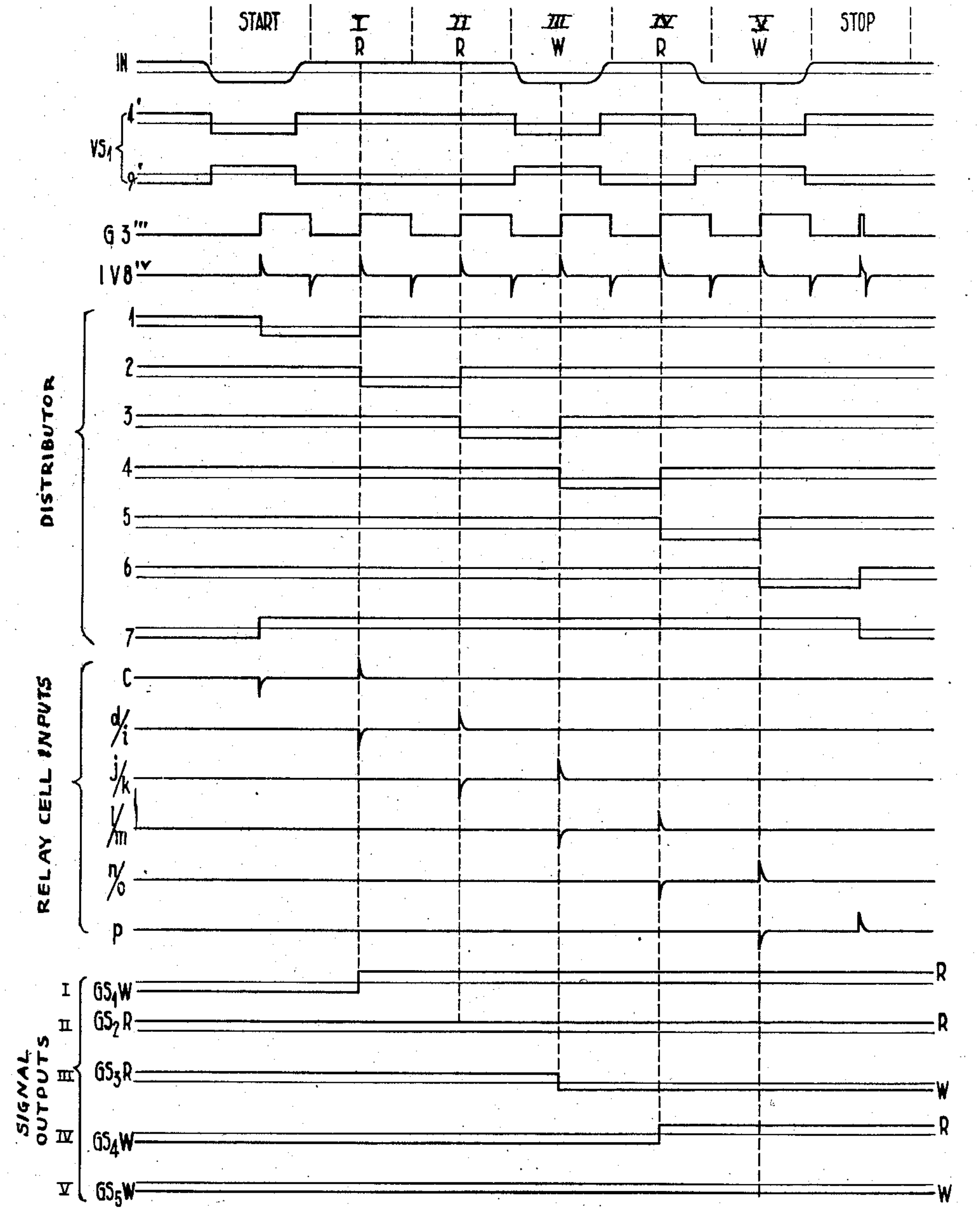
Fig. 10 represents diagrams of the voltages plotted against the time for one multi-element signal at various points of the receiver shown in Fig. 11, illustrating graphically the operation of this receiver in response to an incoming five-unit start-stop code signal wave.

In Fig. 2 is shown a general arrangement of the essential circuits involved in the system of this invention in a block diagram, which arrangement has been adapted for convenience of description to a receiver for the signals shown in Fig. 1. This general circuit comprises the following parts:

(1) An incoming signal amplifier or pulse shaper VS1 for receiving or detecting the signal wave as shown on the first or top line in Fig. 10 and reshaping it into a pair of square edged complementary waves as shown on the second and third lines of Fig. 10;

(2) A start-stop circuit SSS for starting and stopping the multivibrator or generator G;

(3) A generator multivibrator G, preferably of 50 cycles to correspond with the 20 milliseconds' duration elements of the signal received, which generator emits pulses each 10 milliseconds to operate the seven-fold distributor 7VV;

(4) The seven-fold distributor 7VV which scans the signals at the right moment and is connected to a plurality of electronic relay cell means through conductors 1 through 6;

(5) A second or feed-back amplifier circuit VS2 operated by the last pulse through the distributor 7VV which is connected through a feed-back line 15 to the start-stop circuit SSS for stopping the multivibrator G at the end of each signal of five intelligence elements; and (6) Five memory circuits GS1, GS2, GS3, GS4 and GS5 which record the results of the scanning and are connected both to the incoming signal from the amplifier VS1 through conductor 16 as well as to the distributor connections through a series of electronic relay cell means the operation of which will be described in detail later in chapter III with reference to Fig. 11.

A transmitter (shown in Figs. 12) differs from a receiver as shown in Fig. 2, in that instead of the memory circuits GS1–GS5 shown in Fig. 2 there are employed, (7) Imput circuits IS1, IS2, IS3, IS4 and IS5 which are first set according to the five intelligence elements I, II, III, IV and V, respectively, and then scanned by the distributor 7VV; and (8) An additional or output amplifier circuit VS3 (see Fig. 12′) which compiles and transmits the collective signal wave according to that shown in Fig. 1.

A regenerative repeater (shown in Figs. 13) possesses the parts or circuits 1, 2, 3, 4, 5, 6 and 8 of the receiver and transmitter mentioned above, but does not include the imput circuits IS1–IS5, with the addition of an extra memory or storing circuits GS6 for the stop element of the signal and additional electronic relay cell means for combining the outputs of the memory circuits before they are connected to the output amplifier circuit VS3.

It is to be clearly understood that although the circuits of this invention are directed to a five-unit code with start and stop elements, the same principles may be extended to multi-unit codes other than five, without departing from the scope of this invention, in that such is merely a matter of duplication of the portions of the distributor, electronic relay cell means, and memory or storing circuits already shown in the general arrangement in Fig. 2.

(2) *Standard trigger circuit*

The shaper, feed-back and output amplifier circuits VS1, VS2 and VS3, and the storing circuits GS1–GS6 and IS1–IS5 are all standard trigger or flip-flop bi-stable circuits similar to that described in Snijders copending U. S. patent application Serial No. 300,817, filed July 25, 1952, however, a detailed wiring diagram of this trigger circuit is shown again here in Fig. 3.

This standard trigger circuit comprises a pair of electron tubes, such as double triodes B1*a* and B1*b* (which may be for example an E90CC tube), which are connected by means of a number of resistors, and may also contain a pair of neon indicator lamps L1 and L2 to indicate which one of the two tubes is conducting at any given time. These two tubes B1*a* and B1*b* have a common cathode resistor R15 which may be connected through a terminal 11′ to the negative pole of the battery V. The anode resistances of the tubes are connected respectively to parallel resistors R1/R2 and R4/R5 which then may be connected through a terminal 2′ to the positive pole of the battery V. Potentiometers R6/R11 and R9/R19 are connected from the anodes of the tubes B1*a* and B1*b*, respectively, to the negative pole of the battery V, with the taps or center points of these potentiometers between their respective pairs of resistors being connected to the output terminals 9′ and 4′, respectively, of the trigger circuit. Between these two output terminals 9′ and 4′ is connected a pair of resistors R12 and R18 in series with each other, which resistors may be of equal value, and the connection between them may be connected to another terminal 6′ of the trigger circuit, which generally in the systems of this invention is connected to a common ground maintained at a potential between the positive and the negative poles of the battery V. Also in this standard trigger circuit are two high ohmic potentiometers R8/R16 and R7/R14 connected from the respective anodes of the tubes B1*a* and B1*b* to the negative battery pole through the terminal 11′. These two potentiometers R8/R16 and R7/R14 are in parallel with the potentiometers R6/R11 and R9/R19 mentioned above. The tap to potentiometer R8/R16 is connected to the control grid of the tube B1*b* and also through a resistor R17 to the ground terminal 6′. The tap of the potentiometer R7/R14 is connected to the terminal 5′ and also through a resistor R13 to the same ground terminal 6′. The control grid of the tube B1*a* is directly connected to the input terminal 8′ and may also be connected via a resistance R10 to another input terminal 7′. The anode of the tube B1*a* is directly connected to a terminal 10′ and the anode of the tube B1*b* is directly connected to the terminal 3′. The gas filled or neon indicator tubes L1 and L2 are also connected to the anodes of the tubes B1*a* and B1*b*, respectively, and thence via a common resistance R3 through the terminal 2′ to the positive pole of the battery V. Terminals 1′ and 12′ of this trigger circuit supply the current for heating the cathodes of the tubes B1*a* and B1*b*.

If the control grid of the tube B1*a* is strongly negative with respect to its cathode, it is non-conductive and carries no current; and via potentiometer R8/R16 a positive potential is applied to the control grid of tube B1*b* through resistors R8, R1/R2 from the positive terminal 2′. The tube B1*b* is then conductive which makes its anode voltage lower or less positive than the anode voltage of the tube B1*a*, so that the indicator lamp or tube L2 glows and indicator lamp or tube L1 is extinguished. The output terminal 9′ thus has a higher positive voltage than the output terminal 4′, and terminal 6′ has a voltage which is intermediate the voltages of the output terminals 9′ and 4′ because the resistors R12 and R18 are preferably selected to have equal ohmic values. When the potential to the control grid of the tube B1a rises or becomes more positive to a predetermined voltage, this tube B1a will become conductive placing a more negative voltage on the grid of tube B1b through resistor R8, and as a result of which the tube B1b will then become nonconductive. The indicator lamp L1 then begins to glow and the lamp L2 is then extinguished. The output terminals 9′ and 4′ then also interchange their voltages. The circuit is so connected that the transition from one condition to the other takes place substantially instantaneously or with a jump, or triggers, which action occurs within a small voltage range of say about 1 volt or ± half a volt of the predetermined control voltage at the input terminal 7′ or 8′. In either condition of the circuit, however, the terminal 6′ has substantially the same voltage because the resistors R12 and R18 are equal. Thus, if the input terminal 7′ bears a voltage that is nearly equal to the voltage of the terminal 6′, i. e. slightly below or slightly above (i. e. more negative or more positive than) that on terminal 6′, the condition, when tube B1a is non-conductive of the circuit changes.

This operation may be more clearly illustrated by a specific example, the results of which are shown on the graphs in Fig. 4 in this example the values of the resistances or resistors have been considered to be as follows:

R1=R2=R4=R5=R6=R9=R11
=R12=R18=R19=39 kilo ohms (kΩ)
R7=R8=R13=R14=R16=1 megohm (MΩ)
R3=820 kΩ, R10=470 kΩ, R15=50 kΩ and R17=270 kΩ. The battery V has been chosen to have a voltage of 220 volts between its positive and negative poles.

Figure 4:
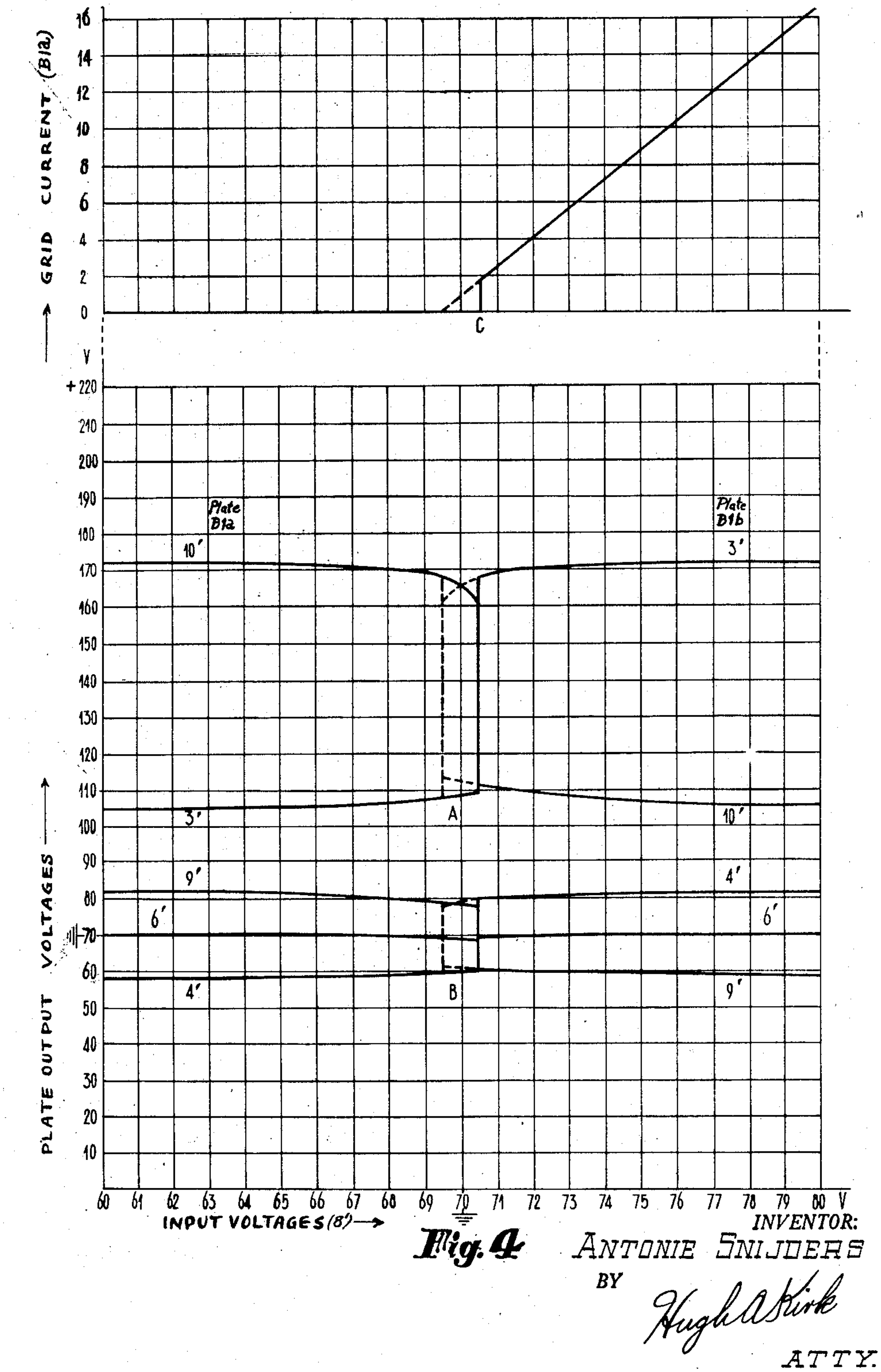
Fig. 4 represents graphs of the grid current and plate output voltages at various input voltages at different terminals of the standard circuit shown in Fig. 3.

With tube B1a non-conductive the output terminals 9′ and 4′ bear voltages of 80 volts and 60 volts, respectively, and the input voltage at terminal 8′ will be lower than 70 volts; while terminal 6′ has a voltage of 70 volts (see Fig. 4). If the input voltage (the abscissa) of the graph shown at B in Fig. 4 is increased above 70 volts to about 70.5 volts, the output voltage (the ordinate) at terminal 4′ changes from 60 volts to 80 volts and terminal 9′ changes from 80 volts to 60 volts. In the case of a further increase of the input voltage at terminal 7′ or 8′, the voltages occurring at the output terminals 4′ and 9′ remain practically unchanged as can be seen by the substantially horizontal lines 4′ and 9′ of the curves in Fig. 4. If the input voltage is decreased, the voltage will revert to the original condition when the input voltage reduces to about 69.5 volts (see the dotted lines at B in Fig. 4).

If the output terminals 9′ and 4′ are loaded, the voltages occurring at these terminals would change, which also would change the voltage occurring at terminal 6′ because it is connected to have a voltage halfway between that at terminals 9′ and 4′, and since there is a coupling between the control grid of the tube B1b through a resistance R17 and the terminal 6′, there would also be a change in the input voltage to tube B1b which could cause the circuit to change its condition. However, since several of these circuits must cooperate in one system according to this invention, the terminals 6′ are connected together so that the voltage levels at their terminals 6′ remain constant and as equal as possible.

The outputs of the tubes B1a and B1b indicated by curves 10′ and 3′, respectively, are disclosed in Fig. 4 to have a wider voltage range than those taken from the terminals 9′ and 4′ because of the resistances of the potentiometers R6/R11 and R9/R19, respectively, through which terminals 9′ and 4′ are connected. There is also shown for comparison purposes at the top of Fig. 4 a graph of the grid current for the tube B1a with respect to the input voltages at terminal 8′ to show when tube B1a is conductive with respect to the voltages at output terminals 3′, 4′, 9′ and 10′.

The output terminal 5′ (see Fig. 3), which is of high ohmic value or nature, may be connected to the input terminal 7′ so that the condition of the trigger circuit remains unchanged after the controlling input voltage has been taken away from the terminal 7′ or 8′. Such a circuit connection is shown by dotted line conductor 21 and is employed in converting the standard circuit of Fig. 3 to the storing or memory circuits GS1–GS6 shown in Figs. 2, 11 and 13.

(3) *Start-stop and generator circuits*

Figures 5, 6:
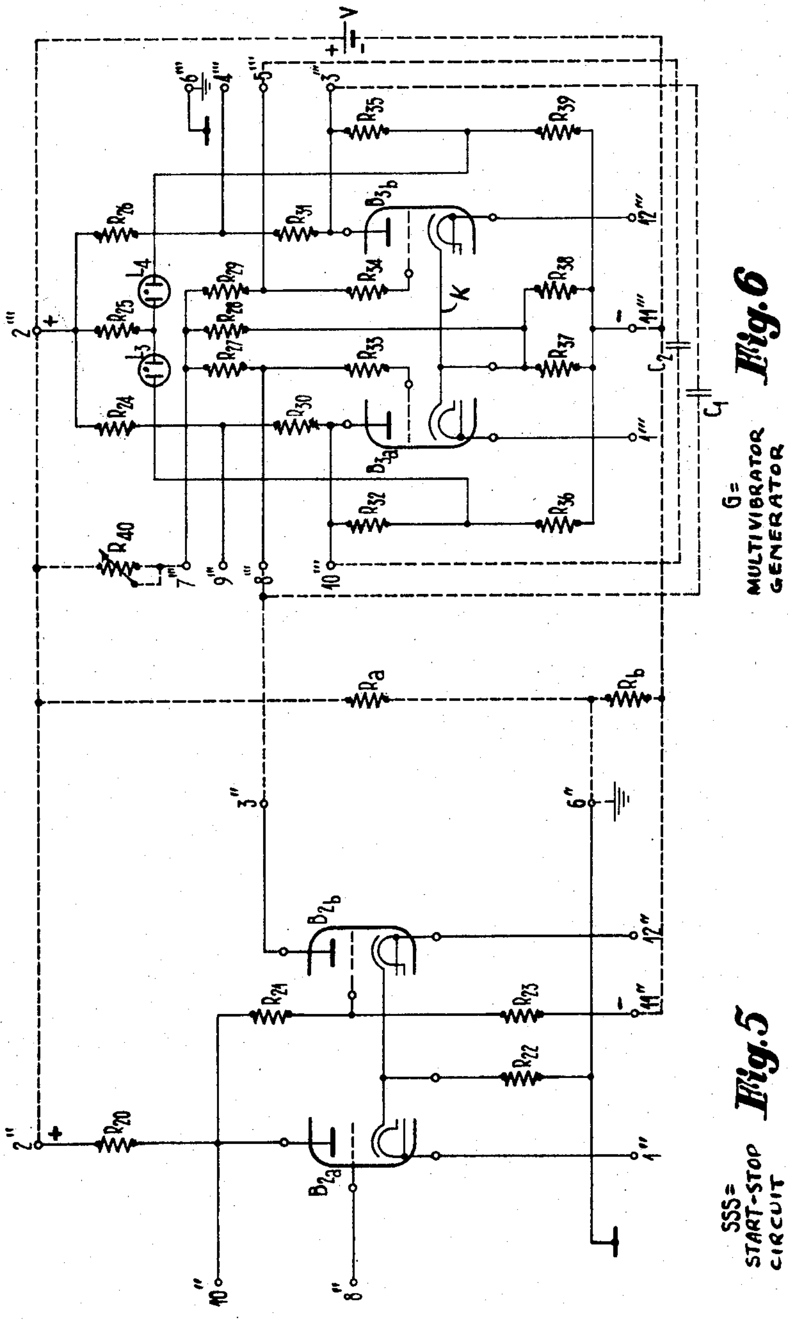
Fig. 5 is a wiring diagram of the start-stop circuit SSS shown in Figs. 2, 11, 12 and 13, together with some of its connections shown in dotted lines.
Fig. 6 is a wiring diagram of the multivibrator generator circuit G in Figs. 2, 11, 12 and 13, together with some of its connections shown in dotted lines.

Detailed circuits of the start-stop circuit SSS and multivibrator or generator G are shown, respectively, in Figs. 5 and 6, with connections to some of their terminals shown in dotted lines in accordance with their normal connection in the circuits of Figs. 2, 11, 12 and 13.

The start-stop circuit shown in Fig. 5 is used for starting and stopping the multivibrator circuit shown in Fig. 6 in response to the start and stop elements of the code signal; the start element pulse being transmitted from the incoming shaper amplifier circuit VS1 through an electron relay cell means to the input terminal 8″ of the start-stop circuit SSS, and the stop element pulse being transmitted from the feed-back amplifier VS2 through an electron relay cell means and conductor 15 also to the input terminal 8″ of the start-stop circuit SSS.

For the purposes of illustration specific examples are presented of a start-stop circuit SSS and a generator circuit G, each of which circuits may comprise a double triode tube B2a/B2b and B3a/B3b, respectively, and may be composed of resistances or resistors having the following ohmic values: In Fig. 5 resistors R20=R23=1.2 MΩ, R21=820 kΩ, R22=27 kΩ; and in Fig. 6 resistors R24=R26=R30=R31=10 kΩ, and R25=680 kΩ
R27=R29=1 MΩ, R28=R37=56 kΩ
R32=R35=270 kΩ, R33=R34=39 kΩ

R36=R39=560 kΩ, R38=47 kΩ. There is also shown connected by dotted lines to the multivibrator or generator circuit G of Fig. 6, two condensers C1 and C2 each of about $2\times10^{-8}$ farads or 0.02 μf. (microfarads).

The voltage at the cathode of the double triode B2a/B2b of the start-stop circuit SSS is about 70 volts and the battery V has a voltage of 220 volts. If the control grid of the tube B2a has a voltage which is lower than 70 volts, this tube is non-conductive and carries no current. As a result of this condition the tube B2b is conductive and does carry current. The anode of tube B2b is directly connected to output terminal 3″.

Referring now to the generator G in Fig. 6, the output terminal 3″ is directly connected to the generator input terminal 8‴, which is then connected both through a resistance R27 to a positive terminal 7‴ and through a resistance R33 to the control grid of the tube B3a of the generator. Thus, the grid of the tube B3a has the same negative potential with respect to its cathode as the grid of the tube B2a in circuit SSS has, if (during the working of the multivibrator) the tube B3a is non-conductive. The control grid of the tube B3b in the generator is connected via resistors R34 and R29 also to the positive potential at the terminal 7‴. Connected at the terminal 7‴, between it and positive battery V, may be a variable resistor R40 by means of which the frequency of the whole multivibrator circuit of Fig. 6 may be adjusted, which in the case for scanning the signal of Fig. 1 is 50 cycles/second. With the grid of tube B3b connected to a positive terminal 7‴, this tube is conductive and the indicator lamp L4 associated therewith glows.

The capacitors C1 and C2 connected, respectively, between the anode of tube B3*b* or terminal 3‴ and the grid of the tube B3*a* through terminal 8‴, and the anode of tube B3*a* or terminal 10‴ and the grid of tube B3*b* through terminal 5‴, are charged to equal voltages by the conductivity of this tube B3*b*. If the voltage in the control grid of the tube B2*a* of the start-stop circuit SSS is increased or becomes more positive to about 70 volts, this tube B2*a* will become conductive and the tube B2*b* will be cut-off or become non-conductive. The capacitor C1 then discharges itself via the resistor R27 and the control grid voltage of tube B3*a* rises. After 10 milliseconds, the tube B3*a* of the generator circuit G becomes conductive and its corresponding indicator lamp L3 glows, this being the time for the discharge of the condenser C1. Then the voltage drop occurring at the anode of the tube B3*a* is transferred by means of the capacitor C2 to the control grid of the tube B3*b* through resistor R34, as a result of which this tube B3*b* now becomes non-conductive. The capacitor C1 is now quickly recharged to the original high value via the anode resistances R26 and R31. In consequence of the discharge of capacitor C2 via the resistor R29, the control grid of tube B3*b* will attain the potential of its cathode again, so that this tube again becomes conductive and the tube B3*a* again becomes non-conductive, etc. Thus, via the time constant circuits C2/R29 and C1/R27 the tubes B3*a* and B3*b* alternately become conductive every 10 milliseconds to produce the pulses at its output terminal 3‴ forming a square wave according to that shown at G3‴ in Fig. 10.

The continued generation of this output wave G3‴ is stopped, however, by putting the tube B2*a* in the start-stop circuit SSS of Fig. 5 in its nonconductive state again, by reducing the control grid voltage of this tube below 70 volts at its input terminal 8″. This is done by a negative pulse potential, corresponding to the stop element of a signal, applied from the end of the distributor 7VV of Fig. 2 through the feed-back amplifier VS2 and conductor 15 to this terminal 8″, to cause the grid of tube B2*a* to become more negative and to shut-off the conductivity of tube B2*a* which in turn causes the tube B2*b* to become conductive again and to shut-off the multivibrator generator circuit G in Fig. 6 at the end of its cycle of oscillation corresponding to the end of a complete code signal.

It is to be observed that if the tube B2*a* in the start-stop circuit becomes conductive for a shorter time than 10 milliseconds, the generator tubes B3*a*/B3*b* will not change their conductivity conditions and the generator G will not start oscillating. If desired, this interval may be shortened or lengthened in two ways: (1) by choosing the various elements, such as resistors of the start-stop circuit SSS such that if the tube B2*b* is conductive, the control grid of the tube B3*a* will have a higher or lower potential than the voltage this grid had if tube B3*a* is non-conductive during the working of the multivibrator; or (2) by choosing the values of the condensers C1 and C2 to be unequal (but so that the multivibrator continues to work on a frequency of 50 cycles).

Figure 7:
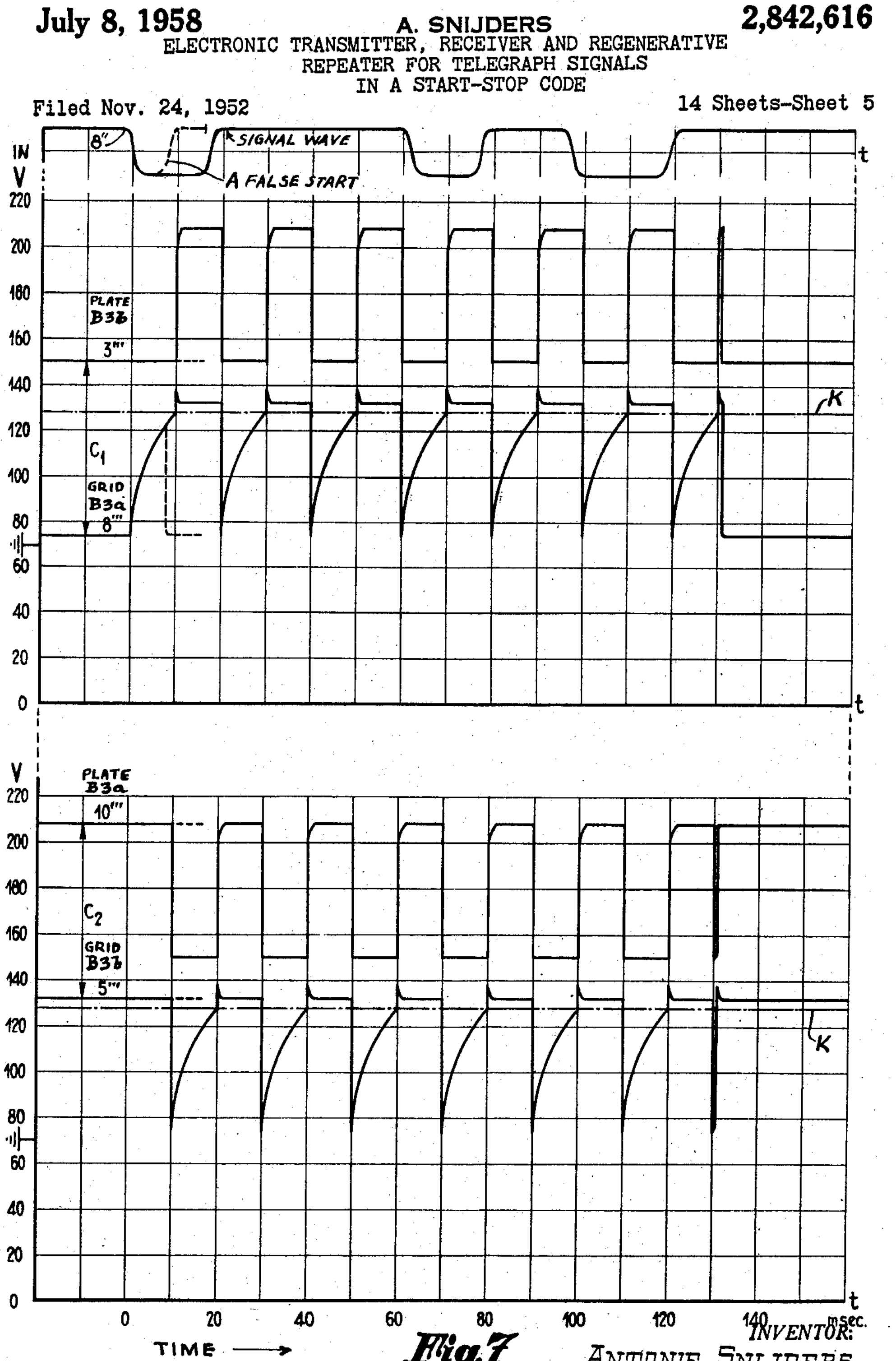
Fig. 7 represents graphs of the voltages with respect to the time for one multi-element signal at various terminals of the multivibrator circuit of Fig. 6.

In Fig. 7 are shown graphs of the potentials at the points of the terminals 3‴, 8‴, 10‴ and 5‴ of the multivibrator circuit of Fig. 6, with respect to the time corresponding to an input code signal wave 8″ of seven elements shown at the top of the graph. It should be noted that the difference between the potentials at the output terminals 3‴ and 8‴ corresponds to the varying charges on condenser C1, and the difference between potentials at the output terminals 10‴ and 5‴ corresponds to the varying charges on condenser C2. The cathode potentials of the two tubes B3*a* and B3*b* of the multivibrator circuit of Fig. 6 is indicated by the dot-dash line K at about 125 volts in each of these graphs. Thus, when the input voltage on terminal 8‴ or 5‴ exceeds the cathode voltage K, the tubes trip over so that the tube B3*a* or B3*b*, respectively, is made conductive and the other tube shuts-off.

It should be noted that a false start pulse or a pulse less than 10 milliseconds in duration, an example of which is shown in the dotted lines at the beginning of the signal 8″ at the top of graph in Fig. 7, is not of sufficient duration to completely discharge the condenser C1 or C2 to reach the cathode potential K, and accordingly any number of such false pulses less than 10 milliseconds in duration will not start the multivibrator circuit G into operation. Thus the multivibrator circuit of Fig. 6 automatically ignores such false start pulses regardless of how often they are repeated.

If desired, between the terminals 9‴ and 4‴, a non-linear resistor, such as NLR′ shown in Figs. 11 and 13, may be inserted as a result of which any voltage variation up to about 10% of the voltage of the battery V will not affect the behavior of the circuit. A similar non-linear resistor NLR2 is also shown connected to the multivibrator G of Fig. 12.

(4) *Distributor circuit*

Figure 8:
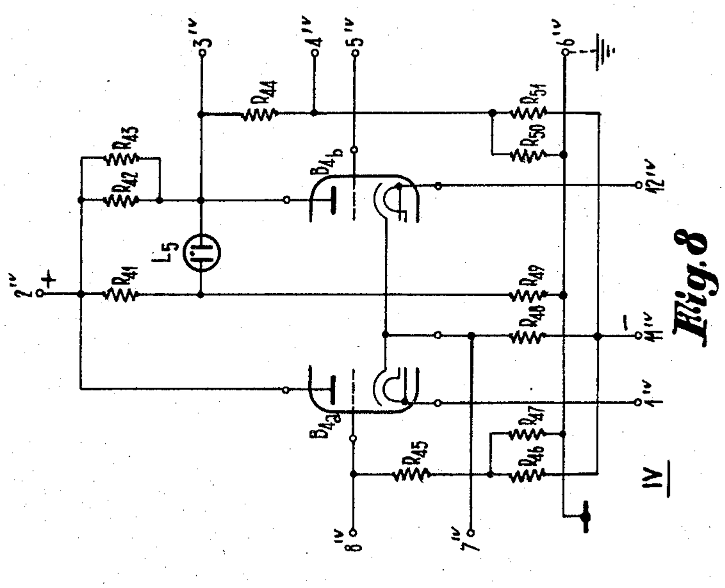
Fig. 8 is a wiring diagram of the distributor circuit IV shown in Figs. 11, 12 and 13 which is a part of the seven-fold distributor circuit 7VV.

According to the specific example of a seven element code signal taken for the description of this invention, a seven-fold distributor consisting of four double tube circuits, namely circuits IV, V1, V2 and V3, are employed in the distributor 7VV of Fig. 2, which circuits are connected as shown in Figs. 11, 12 or 13. A wiring diagram of initial circuit IV is shown in Fig. 8, and for the three remaining identical circuits V1, V2 and V3 in Fig. 9, with their double triode tubes B4*a*/B4*b* and B5*a*/B5*b*, respectively, connected with resistances, terminals and indicator lamps L5, L6, L7.

For the purposes of illustration a specific example of such a distributor circuit is given in which the resistances have the following ohmic values: In Fig. 8: R41=680 kΩ, R42=R43=R44=R50=R51=39 kΩ, R45=150 kΩ, R46=32 kΩ, R47=R48=15 kΩ, and R49=8.2 MΩ; in Fig. 9:

R52=R53=R55=R56=R57=R58=R59
=R60=R62=R63=39 kΩ and R54=680 kΩ, and R61=8.2 MΩ.

In each of the four circuits IV, V1, V2 and V3 of the distributor 7VV, the anodes of each of the seven tubes B4*b*, B5*a* and B5*b* are connected to potentiometers comprising, respectively, resistors R44/R51, R57/R59 and R58/R63. The tapping points of each of these seven potentiometers are between said resistors and are connected, respectively, to the seven output terminals $4^{iv}$, $9^{v}$, $4^{v}$ of said circuits. When the terminals $6^{iv}$ and $6^{v}$ of the four circuits IV, V1, V2 and V3 are grounded, their terminals $2^{iv}$ and $2^{v}$ have a voltage of +150 volts and terminals $11^{iv}$ and $11^{v}$ have a voltage of −70 volts, and the voltages of their said seven output terminals will be either −10 or +10 volts, according to whether the tube whose output is associated with that particular output terminal is conductive or non-conductive respectively. These seven output terminals are successively connected to seven separate conductor rails 1 through 7 (see Figs. 11, 12 or 13). These rails 1–7 are also correspondingly connected through rectifiers or electronic relay cell means G5 . . . 10, G11 . . . 16, G17 . . . 22, G23 . . . 28, G29 . . . 34, G35 . . . 40 and G41 . . . 46 (similar to those described in the Snijders copending application Serial No. 300,817 above mentioned) to the grids of each of the other six triodes making up the distributor 7VV, so that when one of this series of seven tubes is conductive, all of the other six tubes in the series will be non-conductive, and only one of these seven tubes can be conductive at any time, and each successive pulse from the multivibrator G through the tube B4*a* of the circuit of Fig. 8, will successively cause the next tube in said series of seven tubes to become conductive from tube B4*b* to tube B5*b* of circuit V3. This is accomplished by the fact if one of the distributor tubes becomes conductive, a negative voltage is applied via the electron relay cell means connected to its corresponding rail to the control grids of all the other six tubes of the distributor 7VV.

The input tube B4*a* of the circuit in Fig. 8, has its cathode connected to the terminal $7^{iv}$ which terminal is connected to a common conductor 20 (see Figs. 11, 12 or 13) which is connected to the corresponding input terminal $7^{v}$ of each of the circuits V1, V2 and V3. Thus the cathodes of all the tubes B4*a*, B4*b*, B5*a*, B5*b* are maintained at the same potential and connected via a common cathode resistor R48 in Fig. 8 to the negative terminal $11^{iv}$. The input terminal $8^{iv}$ of the circuit IV (and of the whole distributor 7VV) is directly connected to the control grid of tube B4*a* which is also connected via a resistor R45 to a negative potential to maintain a negative grid potential on the grid of tube B4*a* so it will carry no current.

Between each of the seven tubes B4*b*, B5*a* and B5*b* have been provided couplings each consisting of a potentiometer R67/R68 and a condenser C5 in Fig. 11, and potentiometers R69/R70, R71/R72, R73/R74, R75/R76, R77/R78 and R79/R80 and condensers C6, C7, C8, C9, C10 and C11 in Fig. 11′, respectively. One end of each said coupling potentiometer is connected to the anode or output terminal $3^{iv}$, $10^{v}$ or $3^{v}$ of each tube and the other end is connected to a negative potential. The condensers are connected from the tap between the resistors of each potentiometer and the input terminal $8^{v}$, $5^{v}$ or $5^{iv}$ or control grid of the next succeeding tube, with the output of the last tube connected back to the input of the first tube. The condenser C5, C6, C7, C8, C9, C10 or C11 which is connected to the anode of a conductive tube bears a lower voltage than that of the other condensers.

From the first of seven impulses for each signal from the multivibrator G, the tube B4*b* of circuit IV becomes conductive; and the other six tubes B5*a* and B5*b* in circuits V1, V2 and V3 become non-conductive, as has been explained above. Now the next short positive impulse is applied to the control grid of the imput tube B4*a* of circuit IV, causing this tube B4*a* to draw current so that the voltage of the cathodes of all of the other six tubes B5*a* and B5*b* rises, these cathodes are connected by conductor 20 (see Figs. 11 through 13′). This causes tube B4*b* now to become non-conductive and its anode voltage rises and consequently the voltages of the plates of capacitor C5 also rise. The grid voltage of the tube B5*a* in circuit V1 now rises sufficiently to more than counterbalance the original rise of the cathode voltage. Thus tube B5*a* now becomes conductive and tube B4*a* becomes non-conductive again, since the short positive impulse on its control grid from the multivibrator G has now disappeared. After a moment, the grid and cathode of tube B5*a* have the same voltage as the grid and the cathode of the tube B4*b* had in the beginning. Similarly the next or third positive impulse per signal from the multivibrator G which is applied to the control grid of the imput tube B4*a*, will cause the next tube in the series IV tube B5*b*, to become conductive and return tube B5*a* to non-conductivity. From the above, it is evident that the tube following the tube which was conductive always is the next tube to become conductive because only the grid voltage of this next tube is raised by means of the rise in the anode voltage of the preceding tube, and in no other tube does such a rise of grid voltage take place. Accordingly, every 20 milliseconds, a positive pulse is applied from the generator circuit G via capacitor C4 (Fig. 11) to the control grid of the input tube B4*a*, so that successively each tube of the seven-fold distributor becomes conductive for 20 milliseconds. The negative pulses from the multivibrator or generator G do not change the conductivity of these tubes (see Fig. 10, lines $IV8^{iv}$ and 1, 2, 3, 4, 5, 6 and 7).

III. A RECEIVER

Now that the details of the basic circuits employed in this invention have been described, the specific connections and details of a receiver will be described, including the electron relay cell means, which are an important and essential feature of the system of this invention. A wiring diagram for such a receiver is shown in Figs. 11 and 11′ in combination, in which the previously described circuits VS1, VS2, SSS, G, IV, VI, V2, V3, GS1, GS2 GS3, GS4 and GS5 are represented by boxes with their terminals having corresponding numbers to those described in Figs. 3, 5, 6, 8 and 9. First it should be noted that all of the terminals 6′ through $6^{v}$ of all these box circuits are connected to ground. As a result of this, the input level of each circuit is adjusted to ground potential, and the output voltages at the terminals $9^{v}$, $4^{iv}$ and $4^{v}$ of the distributor 7VV have values of plus 10 volts or minus 10 volts with respect to ground. This is in accordance with the specific examples mentioned above, wherein a battery of 220 volts is employed with its corresponding poles connected to all of the positive poles 2 having a +150 volts with respect to ground and the negative poles 11 of these circuits having a −70 volts with respect to ground.

Figure 3:
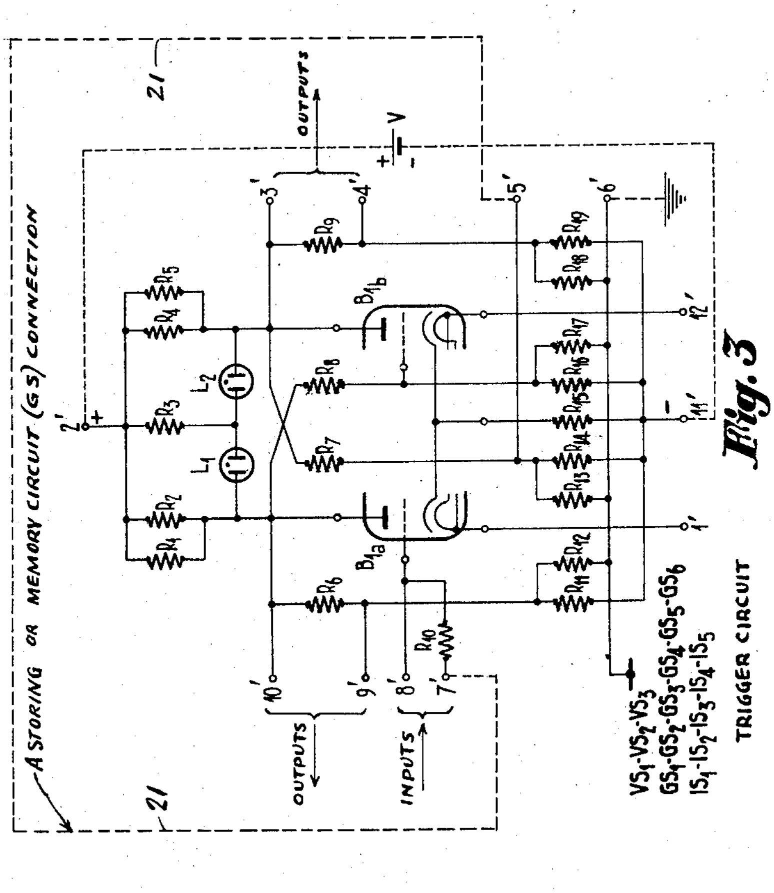
Fig. 3 is a wiring diagram of the standard trigger or special flip-flop circuit, which is employed several times in each of the different systems embodying the present invention as circuits VS1 through VS3, and GS1 through GS6 in Figs. 2, 11, 12 and 13 and circuits IS1 through IS5 in Figs. 12, together with some of the employed connections shown in dotted lines.
Figure 9:
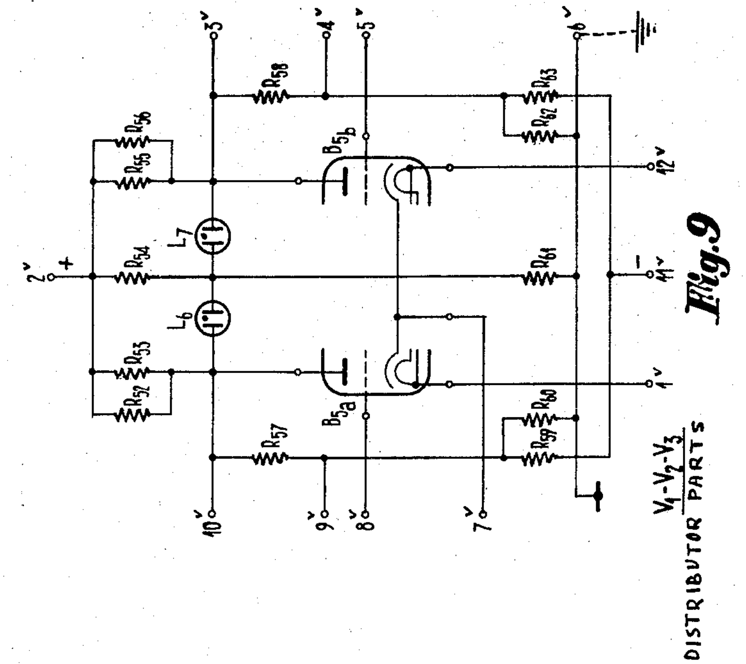
Fig. 9 is a wiring diagram of one of the distributor circuits V1, V2 and V3 shown in Figs. 11, 12 and 13 which are part of the seven-fold distributor circuit 7VV.

The circuits VS1, VS2 and GS1 through GS5 are standard bi-stable trigger circuits according to those described in Fig. 3; the start-stop circuit SSS is according to Fig. 5; the multivibrator generator circuit G is according to Fig. 6; the circuit IV is according to Fig. 8, and the distributor circuits V1, V2 and V3 are according to Fig. 9.

(1) *Rest condition*

In describing the operation of the circuits of Figs. 11 and 11′ as a receiver, the arriving multi-element code signal is applied to the input terminal IN connected directly to terminal 7′ of shaper-amplifier circuit VS1, which terminal has in its rest condition a positive voltage with respect to ground, due to the resistor R64. Before a signal has been received and when the system is in its rest or idle condition the seventh distributor tube B5*b* in circuit V3 is supposed to be conductive, so that the rail conductor 7 has a negative voltage of 10 volts with respect to ground, and the other rails 1–6 of the distributor circuit 7VV are positive by 10 volts with respect to ground. The control grid connected to the terminal 7′ of the feed-back amplifier circuit VS2 is then negative so that the output terminals 9′ and 4′ of this feed-back amplifier circuit VS2 are then positive and negative, respectively. Thus with an idle or rest positive potential an input terminal 7′ of circuit VS1, its output terminals 9′ and 4′ are negative and positive, respectively, with respect to ground.

There is shown above the feed-back amplifier circuit VS2 in Fig. 11, a pair of electron relay cell means each comprising rectifiers connected to a common junction, which junctions are indicated at *a* and *b*, respectively. The junction *a* is connected via the rectifier G1 and G2 to the terminal 9′ of the input amplifier VS1 and to the terminal 9′ of the feed-back amplifier VS2, respectively. This junction *a* assumes the more negative voltage of these two terminals 9′ of VS1 and VS2, and is therefore negative. The junction *b*, however, receives via the rectifier G3 from the junction *a* a negative voltage, and via rectifier G4 from the output terminal 4′ of the feed-back amplifier circuit VS2 also a negative voltage. Consequently, the tube B2*a* in the start-stop circuit SSS is non-conductive, and as has already been described, the generator G is inactive, and the seven-fold distributor 7VV remains in its seventh position as just described.

Such is the normal idle or rest condition of the receiver before a signal is received.

(2) *Start-stop and distribution*

If a signal arrives at the input terminal IN of the receiver, the terminal 7′ of circuit VS1 becomes negative in consequence of the negative start element of the signal shown in Fig. 1, and junction *a* becomes positive and consequently also junction *b* which is directly connected to input terminal 8″ of the start-stop circuit SSS to cause the tube B2*a* to now become conductive and start the generator circuit G. After 10 milliseconds the generator tubes B3*a* and B3*b* of circuit G change conductivity and a positive impulse is passed via the capacitor C4 to the seven-fold distributor 7VV to start the scanning of the following intelligence elements of the signal.

The seven-fold distributor 7VV then changes its negative rail position from rail 7 to the rail 1 so that rail 7 becomes positive and the feed-back amplifier circuit VS2 changes its position. Via the conductor 15 and the rectifier G4, the positive voltage now present at the output 4′ of circuit VS2 is maintained on junction *b* maintaining the input voltage to the start-stop circuit SSS positive so that the generator G goes on oscillating undisturbed regardless of the intelligence element polarities applied to junction *a* from circuit VS1, because output terminal 9′ of circuit VS2 keeps it negative via rectifiers G1 and G2. This oscillation of circuit G continues until 130 milliseconds after the beginning of the first start element when the seven-fold distributor 7VV reaches its seventh position again putting a negative potential on rail 7 and changes the conductive condition of circuit VS2. This change places a negative voltage at the junction *b* also irrespective of the polarity of the input terminal IN. When the impulse for the seventh position of the distributor has been received by the start-stop circuit SSS, the generator G is immediately stopped and the scanning circuits assume their normal rest condition again. After this time the junction *a* then again can be under the control of the input terminal IN, so that the next start element of the succeeding signal will start the scanning circuits again. However, the generator circuit G remains inactive as long as the input terminal IN is positive. For example, adjusting this time delay by means of the capacitor C3 to 5 milliseconds, a 135 milliseconds may pass after the beginning of the start element before it is possible again to receive a new signal. If in consequence of the distortion of the signal, the input terminal IN has become negative before these 135 milliseconds have elapsed, the receiver waits until the end of these 135 milliseconds before it starts its next receiving cycle. Thus, by adjusting the value of the condenser C3 the duration of the final or stop pulse element of each signal may be varied, and new signals may be prevented from being received until the discharge from the condenser C3 has completely taken place.

Referring now to the timing diagram shown in Fig. 10, the input signal IN is represented by the wave form at the top of the diagram. The next two lines indicate the potentials at the terminals 4′ and 9′ of the input shaper-amplifier circuit VS1. The next line G3‴ represents the potential at the output terminal 3‴ of the 50 cycle multivibrator generator circuit G. This output wave G3‴, however, is converted by the condenser C4 into the next and a positive and negative pulse wave IV8$^{iv}$ having alternate positive and negative pulses every ten milliseconds corresponding with the leading and trailing edges of the square pulses from wave G3‴ from the output of the multivibrator G. This wave IV8$^{iv}$ triggers the distributor 7VV to produce potential pulses of 20 milliseconds' duration consecutively on each of the rails 1–7 as shown in the graph. Accordingly, the distributor 7VV successively scans the signal of the input wave IN at substantially the mid-point of each element as shown by the vertical dotted lines in Fig. 10.

(3) *Scanning and storing*

In Figs. 11 and 11′ the memory circuits GS1 through GS5 comprise bi-stable trigger circuits as a result of the connections 21 connecting their terminals 5′ and 7′, previously described in Chapter II above. Since the scanning is the same for each element of the signal, its function will only be described in connection with the setting of the first memory circuit GS1.

Referring now to this circuit GS1 and the storing of element I of the signal, this circuit is connected both to the signal input shaper amplifier VS1 and to the distributor 7VV through electronic relay cell means. In Fig. 11, above circuit GS1, are shown a pair of input terminals *c* and *d* to two such electronic relay cell means, which input terminals *c* and *d* are normally maintained (in rest condition) at negative 10 volts and positive 10 volts with respect to ground, by being connected to the taps of two separate potentiometers R81/R84 and R85/R87, respectively. These voltages at terminals *c* and *d* thus correspond with the two different voltages applied to the rails 1 to 7 of the distributor 7–VV. Each of these two electronic relay cells, corresponding to terminal junctions *c* and *d*, have their own junctions *e* and *f* which are connected together through rectifiers G48 and G50 to another input terminal *g* which is common for both said cell means, and is directly connected through conductor 16 to the output terminal 4′ of the input shaper-amplifier circuit VS1. Thus the voltage at the junction *e* is equal to the more negative voltage of the terminals *c* and *g*, consequently negative, irrespective of the voltage at the signal input IN conveyed via the conductor 16 to the input terminal *g*, as long as the input terminal *c* remains negative; and the voltage at the junction *f* is equal to the more positive voltage of the terminals *d* and *g*, consequently positive, also irrespective of the input voltage at IN or on terminal *g*, as long as the input terminal *d* is positive. The junctions *e* and *f* of the two electronic relay cell means are connected together through rectifiers G49 and G51 to an output terminal *h* which is common to both said relay cell means. This junction *h* therefor assumes any potential between +10 volts and −10 volts with respect to ground that is conveyed to it from both the junctions *e* and *f* of the first two electronic relay cell means, and this junction *h* is accordingly directly connected to the input terminals 5′ and 7′ of the memory device GS1 which correspondingly takes either of two positions corresponding to these two voltages at the junction *h*.

The output terminal 3$^{iv}$ of the first distributor tube B4*b* in the circuit IV of the distributor 7VV, is connected via a resistor R83 and a capacitor C12 to the input terminal *c* of the first electronic relay cell means, and the output terminal 10$^{v}$ of the second distributor tube B5*a* is connected to the input terminal *d*. At a time 10 milliseconds after the beginning of the start element of the signal being scanned, the first distributor tube B4*b* becomes conductive and passes a negative impulse to the terminal *c* through condenser C12. This has no effect on the potential at terminal *c* since it already is negative. However, 30 milliseconds after the beginning of the start element, or within another 20 milliseconds, the first tube B4*b* becomes non-conductive again and the second tube B5*a* in circuit VI becomes conductive. At this moment the terminal *c* becomes positive and terminal *d* becomes negative, changing both their normal potentials. If, however, the input terminal IN and consequently the junction *g* at this instant is positive in response to the first and positive element I in Fig. 1, the junction *e* becomes positive and the junction *f* remains positive, so that a positive potential is applied to the junction *h* which is applied to the input terminals 7′ and 5′ of the circuit GS1. If the memory circuit GS1 is in its positive condition, it then remains in this condition due to this positive potential from junction $h$. However, if the memory circuit GS1 is in its negative condition, it is then put into its positive condition by this positive potential applied via rectifier G49 to its input terminals 5′ and 7′. Thus the first element I of the signal in Fig. 1, which is a positive or space intelligence element, is stored or recorded in the bi-stable memory circuit GS1.

In the case a negative input voltage is applied at IN due to the fact that the first element pulse I is a mark element instead of a space as shown in Fig. 1, then the input terminal $g$ becomes negative, and the junction $e$ would remain negative, while the junction $f$ would then become negative. If the memory circuit GS1 were then in its positive condition, it would then be put into its negative condition by the negative potential applied via the rectifier G51 to its input terminals 5′ and 7′.

For scanning the second intelligence element II the potentials due to the transition from the second to the third distributor tube in circuit V1 of the distributor 7VV are employed in a similar manner, and so on for each successive element III, IV and V.

After the middle of the fifth intelligence element V is received, and the five memory circuits GS1 through GS5 have been set according to the polarity of all five of the intelligence elements, the output terminals I′ through V′ connected to terminals 4′ and corresponding to those elements I through V, render by means of positive or negative potentials the condition or setting of these memory circuits GS1 through GS5.

Referring now to Fig. 10, the input terminals $c$, $d/i$, $j/k$, $l/m$, $n/o$ and $p$ of the electronic relay cell means are indicated to show how these waves in cooperation with the signal wave IN operate the memory circuits GS1 through GS5 or charge or maintain their output potentials at terminals I′ through V′. These five separate signal output potentials R, R, W, R, W may be used to operate a tape printer or other receiving device in a telegraph station in which a five unit code of this type can be detected.

It is also possible to scan, determine and store the start and/or stop elements of each signal in a similar manner, however, there is no necessity for doing so in a receiver because the start and stop elements are always the same and always of opposite polarity, and are not required for intelligence. Nevertheless, in a regenerative repeater as will be described in connection with Figs. 13 in chapter V later, it will be seen that one of these two synchronizing elements must be stored for effecting the immediate repetition of the signal, element by element, in proper sequence.

IV. A TRANSMITTER

The fully electronic system of this invention is adapted to a transmitter according to the circuit connections and electronic relay cell means shown in Figs. 12, namely Figs. 12 and 12′, in which the similar parts or circuits which have been described above are arranged in a similar manner and have their same functions. Namely, the terminals 6′—$6^{v}$ of each of the block or box circuits are connected to ground as before, the circuits VS2, VS3 and IS1 through IS5 are standard bi-stable trigger circuits according to Fig. 3, the start-stop circuit SSS is in accordance with Fig. 5, the multivibrator generator circuit G is in accordance with Fig. 6, and the circuits of the distributor 7VV, namely circuit IV is according to Fig. 8 and the circuits V1, V2 and V3 are according to Fig. 9.

There does not occur in a transmitter, however, an input shaper-amplifier circuit VS1 in that the signal as shown in wave of Fig. 1 is produced in the transmitter and needs no reshaping, but instead an outgoing amplifier circuit VS3 is employed the output terminal U of which appears at the right hand side of Fig. 12′.

It is necessary however for the starting or energization of this transmitter that a start pulse be applied at the input terminal S at the left side of Fig. 12 which will start the scanning device including start-stop circuit SSS, multivibrator G and distributor circuit 7VV. This may be effected either automatically by maintaining terminal S positive, or anew after each of the five elements I–V of the code have been placed on the incoming bi-stable circuits IS1–IS5 over the corresponding input terminals I″–V″. This start pulse may be controlled by the stepping of a tape printer from which the corresponding signal element potentials are also received and stored in the input circuits IS1–IS5 via their terminals 7′. The starting and operation of the distributor 7VV is the same as for the receiver described above in chaper III and it consecutively connects the circuits IS1–IS5 to the input terminal 7′ of the output amplifier VS3 through a common conductor junction 22 of an electronic relay cell means. This junction 22 is connected via six rectifiers G108, G110, G113, G116, G119 and G122 to six junctions $a2$, $b2$, $c2$, $d2$, $e2$ and $f2$ of six separate electronic relay cell means. Each of these six junctions are also separately connected via six other rectifiers G107, G111, G114, G117, G120 and G123 to corresponding separate and consecutive distributor rails 1–6 of the distributor 7VV. Junctions $b2$ through $f2$ are also connected via rectifiers G109, G112, G115, G118 and G121 to the output terminals 4′ of the circuits IS1–IS5, respectively. In the rest condition of the transmitter the distributor rail and conductor 7 is negative and the rails 1 through 6 are positive, so that the junctions $a2$–$f2$ connected to the rails 1–6 are normally positive as well and will not become negative unless a negative potential is applied to them. Thus the output circuit VS3 which is connected by conductor 22 to these positive junctions, has its first tube B1$a$ conductive and issues a positive voltage at its output terminal U connected to terminal 4′ corresponding to a stop element signal.

If the transmitter is started, then the first distributor tube B4$b$ will become conductive after 10 milliseconds, and the first distributor rail 1 will become negative for 20 milliseconds, so that junction $a2$ will become negative too. The output circuit VS3 then uses this negative voltage from the rail 1 through rectifier G107 as the start element of its signal. Next the second distributor tube B5$a$ of circuit VI becomes conductive for the next 20 milliseconds and the junction $b2$ is given an opportunity to become negative under the control of its corresponding input circuit IS1. With a positive input voltage from the circuit IS1, the junction $b2$ remains positive and a stop or positive polarity element is now transmitted as the first intelligence element I from the output terminal U. If on the contrary, the input circuit IS1 has been put in the other or negative condition, the junction $b2$ will become negative for 20 milliseconds and the terminal U will become negative to send a mark or negative element I from its terminal. Similarly, the following input circuits IS2 through IS5 are successively scanned, each for 20 milliseconds and the corresponding elements II through V are transmitted in succession from the output terminal U to produce a signal wave similar to that shown in Fig. 1. When the seven-fold distributor 7VV arrives in its seventh position, there is always sent a positive voltage or stop element because all of the rails 1–6 are positive again, and only rail 7 is negative which is not connected to conductor 22 but only to the input terminal 7′ of the circuit VS2 cutting off its first tube so that a positive potential is produced at its terminal 4′ to stop the generator G.

In Fig. 12 a variable condenser C3″ is connected to the output terminal 9′ of this circuit VS2 which condenser can maintain a negative charge on the junctions $a$ and $b$ of electron relay cell means which will delay the storing of start-stop circuit SSS a sufficient time to produce a stop element of a given corresponding duration before an applied positive potential at S will restart the scanning circuits. This condenser C3″ eliminates the necessity of applying positive pulses from the tape feeder after each signal to the terminal S if terminal S is kept positive, so that as soon as the charge leaks off the condenser C3″, the circuit will automatically start again in a regular sequence. The normal duration of 140 milliseconds for each signal can be reduced, if necessary, to 135 milliseconds by changing the value of the condenser C3″. Accordingly, the transmitter will continue automatically to transmit signals as long as signal element potentials appear on the circuits IS1–IS5, and if such are changed each cycle of the distributor, these changes will be successively transmitted.

V. A REGENERATIVE REPEATER

The adaptation of the system of the present invention to a 5-unit start-stop telegraph code regenerative repeater is shown in Figs. 13, or Figs. 13, 13′ and 13″, wherein similar circuits have been given similar reference characters and their functions and operations are the same as those described above, particularly with respect to the receiver in Fig. 11 with the addition of a sixth memory circuit GS6 for the stop element of each signal and addiitonal electronic relay cell means for consecutively and instantaneously retransmitting the stored elements through an outgoing amplifier VS3, similar to that shown in the transmitter of Fig. 12′. Here again the terminals 6′ through $6^{v}$ of each of the block or box circuits are grounded as before, the circuits VS1, VS2, VS3 and GS1–GS6 are standard bi-stable trigger circuits according to Fig. 3; the start-stop circuit SSS is according to Fig. 5; the multivibrator generator circuit G is according to Fig. 6; and the distributor circuit 7VV is according to the circuit IV of Fig. 8 and circuits V1, V2 and V3 of Fig. 9.

The signal to be regenerated and repeated arrives at the input terminal IN, similar to that of the receiver of Fig. 11, after which it starts the scanning circuits and stores the intelligence elements in the memory GS1–GS5 as already described above. However, herein the stop or seventh element of each signal is also stored in an extra or added memory circuit GS6 shown in Fig. 13″.

As soon as the elements are stored, they are immediately retransmitted under the control of the same element of the distributor 7VV, rails 1–7 of which distributor are also connected to an additional series of electronic relay cell means shown in Fig. 13″ comprising rectifiers G83 through G102, that are thereby successively connected to the input terminal 7′ of the outgoing circuit VS3.

A separate memory circuit is not necessary for the start element of the signal in that its arrival always is responded to by starting the scanning circuits. Accordingly it is retransmitted 10 milliseconds after it is received through the rail 1 of the distributor 7VV in a similar electron relay cell means action to that described for the transmission of the start signal in the transmitter of Fig. 12 in chapter IV.

For the stop element, however, a separate memory or storing circuit GS6 may be provided, although this circuit GS6 may be eliminated and the stop element may be transmitted automatically as in the case of the transmitter circuit of Figs. 12 and 12′, from which stop element the next start element for the next succeeding code signal to be transmitted may be formed. However, if there were no such a memory circuit GS6 an uninterrupted sequence of start polarity elements corresponding to a clearing signal could not be retransmitted, because periodically a start polarity element would be replaced by a stop polarity element.

Attention is herein called again to the condenser C3′ shown connected to the output terminal 9′ of the feedback amplifier circuit VS2 in Fig. 13, which condenser can be adjusted as condensers C3 and C3″ in Figs. 11 and 12 to produce stop elements of different durations, and accordingly signals of different durations to enable a fresh signal to start within 135 milliseconds after a preceeding signal has been started. This of course would be necessary if the signals which are to be retransmitted are received from a transmitter working at too high a speed, or if too short a stop element is transmitted from the initial transmitter. Also the condenser C3′ may be so adjusted that 140 milliseconds after the beginning of the start element a fresh signal can be received and all the elements transmitted have a duration of 20 milliseconds including that of the stop element. In case signals are received at terminal IN from a transmitter working at too slow a speed, the stop element may be lengthened by an amount equal to the difference in the duration of the signal transmitted at said slow speed and a signal transmitted at normal speed.

While there is described above the principles of this invention in connection with specific apparatus, it is to be clearly understood that this description is made only by way of example and not as a limitation to the scope of this invention.

What is claimed is:

1. In a communication system for signals of a given number of successive substantially equal time-spaced intelligence elements, said system comprising: means for scanning the elements in each signal comprising first electronic relay cell means corresponding to each element of said signal, separate means for storing separate elements of said signal, and second electronic relay cell means corresponding to each storing means and connecting its corresponding storing means and its corresponding first electronic relay cell means of said scanning means.

2. A system according to claim 1 wherein each said electronic relay cell means comprises at least one pair of rectifiers on a conductor with a junction between them, all of said rectifiers being conductive in the same direction with respect to said junction.

3. A system according to claim 1 including an additional electronic relay cell means for limiting the operation of said scanning means for the duration of one signal.

4. A system according to claim 1 wherein said scanning means comprises a multivibrator synchronized to the time-spacing of said elements in said signal.

5. A system according to claim 4 wherein said scanning means includes a distributor circuit controlled by said multivibrator.

6. A system according to claim 5 wherein said distributor comprises a series of tube circuits corresponding in number to at least the number of elements in said signal.

7. A system according to claim 6 wherein said scanning means includes a plurality of conductors, one corresponding to each element of said signal, which conductors are connected to said tube circuits and to said electronic relay cell means of said scanning means.

8. A system according to claim 1 wherein said storing means includes a bi-stable trigger circuit for each said element to be stored.

9. A system according to claim 1 wherein said means for scanning includes means for detecting only substantially the center of each time-spaced element of said signal.

10. A system according to claim 1 wherein each one of said elements has one of two different values, and wherein said storing means have a common input connected to each of said second electronic relay cell means associated with its corresponding storing means.

11. A system according to claim 1 for a receiver of said signals including separate storing means corresponding to each intelligence element of said signal.

12. A system according to claim 1 for a transmitter of said signals wherein said scanning means produces said signal from said elements stored in said storing means.

13. A system according to claim 1 for a regenerative repeater of said signals wherein said scanning means stores and immediately retransmits each intelligence element of said signal.

14. In a start-stop communication system for signals of a given number of successive time-spaced elements, each signal including at least one synchronizing element and a plurality of substantially equal time-spaced intelligence elements, said system comprising: means for starting said system in response to a synchronizing element of a signal, means for scanning the elements in said signal connected to and instigated by said starting means and including first electronic relay cell means corresponding to each of said elements of said signal, separate storing means corresponding to each of said intelligence elements of said signal, and second electronic relay cell means corresponding to each of said intelligence elements of said signal connecting its corresponding storing means and its corresponding first electronic relay cell means of said scanning means to control said storing means corresponding to said elements to be stored.

15. A system according to claim 14 wherein said starting means includes a third electronic relay cell means for controlling the operation of said scanning means during the duration of said signal.

16. A system according to claim 14 including means connected to said starting means to prevent said starting means from operating in response to signal elements of a time duration less a predetermined time duration.

17. A system according to claim 14 wherein said starting means includes means for adjusting the time duration of said signal between the synchronizing elements of two successive signals.

18. A system according to claim 14 for a regenerative repeater for said signals including a storing means for one synchroning element in said signal.

19. In a start-stop communication system for signals of a given number of successive substantially equal time-spaced elements, each signal including a start and a stop element and a plurality of intelligence elements between said start and stop elements, said system comprising: means for starting and stopping said system in response to said start and stop elements respectively of each signal, means for scanning said intelligence elements in each signal connected to and instigated by said starting means, said scanning means including first electronic relay cell means corresponding to each of said intelligence elements of each signal, separate means for storing at least each of said intelligence elements of each signal, and second electronic relay cell means corresponding to each of said intelligence elements of each signal connecting its corresponding storing means and its corresponding first electronic relay cell means of said scanning means to control said storing means.

20. A system according to claim 19 including means connected to said starting and stopping means for varying the duration of said stop element of said signals.

21. A system according to claim 19 wherein said scanning means includes a multivibrator circuit and means for varying the frequency of said multivibrator.

22. A system according to claim 19 wherein said scanning means includes a delay means for operating the scanning means to scan only the center portion of each time-spaced element of said signal.

23. In a start-stop telegraph code communication system for signals of a given number of successive substantially equal time-spaced elements, each signal including a start element, a stop element, and a plurality of intelligence elements between said start and said stop elements, said system comprising: separate memory circuit means corresponding at least to each said intelligencc element of a signal, a starting means responsive to said start element of each signal, a multivibrator generator circuit connected to said starting means and controlled by said starting means, a distributor circuit connected to and controlled by said multivibrator and including first electronic relay cell means corresponding to each element of said signal, means controlled by said distributor circuit for operating said starting means to stop said multivibrator after each cycle of operation of said distributor, said multivibrator being timed for scanning each element of said signal substantially at its center, and second electronic relay cell means corresponding to each said memory circuit means and connecting its corresponding memory circuit means and its corresponding first electronic relay cell means of said distributor circuit.

24. A communication system for multi-element time-spaced signals having: a time base generator, a distributor connected to and controlled by said generator means for scanning the center of each element of each signal, means connected to said distributor for storing separate elements of each signal, and means connected to said generator for stopping and starting said generator, the improvement comprising: electronic relay cell means corresponding to each element of each signal and connecting said scanning means and said storing means.

25. A system according to claim 24 wherein each said electronic relay cell means comprises at least one pair of rectifiers on a conductor with a junction between them, all of said rectifiers being conductive in the same direction with respect to said junction.

26. A communication system for multi-element time-spaced signals having: a time base generator, a distributor connected to and controlled by said generator, means connected to said distributor for scanning the center of each element of each signal, and means connected to said generator for stopping and starting said generator, the improvement comprising: electronic relay cell means in said distributor having at least two rectifiers corresponding to each element of each signal.

27. A communication system for equal multi-element time-spaced signals, each signal including a start and a stop element and a plurality of intelligence elements between said stop and start elements, said system having: a time base generator, a distributor connected to and controlled by said generator, means connected to said distributor for scanning the center of each element of each signal, and means connected to said generator for stopping and starting said generator, an improvement comprising: variable means connected to said stopping and starting means for conditioning said generator to respond only to signal elements of at least a predetermined time duration.

28. A system according to claim 27 wherein said means for varying the duration of said stop element comprises a variable condenser.

References Cited in the file of this patent

UNITED STATES PATENTS

| | | |
|---|---|---|
| 2,543,874 | Shenk | Mar. 6, 1951 |
| 2,595,714 | Slayton | May 6, 1952 |
| 2,612,562 | Baker | Sept. 30, 1952 |
| 2,612,563 | Dain | Sept. 30, 1952 |
| 2,648,725 | Wright et al. | Aug. 11, 1953 |
| 2,649,502 | Odell | Aug. 18, 1953 |
| 2,732,428 | Dain | Jan. 24, 1956 |

FOREIGN PATENTS

| | | |
|---|---|---|
| 945,227 | France | Nov. 22, 1948 |